US009295039B2

(12) United States Patent
Han et al.

(10) Patent No.: US 9,295,039 B2
(45) Date of Patent: Mar. 22, 2016

(54) METHOD AND APPARATUS FOR TRANSMITTING CONTROL INFORMATION IN A WIRELESS COMMUNICATION SYSTEM

(71) Applicant: LG ELECTRONICS INC., Seoul (KR)

(72) Inventors: Seunghee Han, Anyang-si (KR); Dongcheol Kim, Anyang-si (KR); Sungho Moon, Anyang-si (KR); Hangyu Cho, Anyang-si (KR); Jinmin Kim, Anyang-si (KR); Hyunwoo Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/269,393

(22) Filed: May 5, 2014

(65) Prior Publication Data

US 2015/0139174 A1    May 21, 2015

Related U.S. Application Data

(63) Continuation of application No. 13/279,215, filed on Oct. 21, 2011, now Pat. No. 8,755,343.

(60) Provisional application No. 61/444,770, filed on Feb. 20, 2011, provisional application No. 61/409,118, filed on Nov. 2, 2010, provisional application No. 61/405,624, filed on Oct. 21, 2010.

(30) Foreign Application Priority Data

Oct. 10, 2011   (KR) ........................ 10-2011-0103023

(51) Int. Cl.
*H04W 52/14*     (2009.01)
*H04W 72/04*     (2009.01)
(Continued)

(52) U.S. Cl.
CPC ......... *H04W 72/0413* (2013.01); *H04L 1/0028* (2013.01); *H04L 1/1671* (2013.01);
(Continued)

(58) Field of Classification Search
USPC ......................................................... 370/329
See application file for complete search history.

(56) References Cited

U.S. PATENT DOCUMENTS 8,553,671 B2    10/2013   Kim et al.
2009/0203323 A1  8/2009   Ratasuk et al.
(Continued)

FOREIGN PATENT DOCUMENTS

CN    101720122    6/2010
CN    101820672    9/2010
(Continued)

OTHER PUBLICATIONS

Alcatel-Lucent et al. "Power Control for PUCCH format 3" Jan. 17, 2011, R1-110556.*
(Continued)

*Primary Examiner* — Robert M Morlan
(74) *Attorney, Agent, or Firm* — Lee, Hong, Degerman, Kang & Waimey

(57) ABSTRACT

A wireless communication system is disclosed. Disclosed herein are methods for transmitting a physical uplink control channel (PUCCH) signal in a wireless communication system, which includes setting transmit power for the PUCCH signal, and an apparatus thereof. If the PUCCH signal is transmitted on a subframe configured for a scheduling request (SR), the PUCCH signal includes one or more hybrid automatic repeat request acknowledgement (HARQ-ACK) bits and an SR bit. When determining the transmit power for the PUCCH, the SR bit is selectively considered depending on whether or not a transport block for an uplink shared channel (UL-SCH) is present in the subframe.

18 Claims, 31 Drawing Sheets

(51) Int. Cl.
*H04L 1/00* (2006.01)
*H04L 1/16* (2006.01)
*H04W 52/32* (2009.01)
*H04W 52/48* (2009.01)
*H04L 1/18* (2006.01)
*H04L 5/00* (2006.01)
*H04W 72/12* (2009.01)
*H04W 52/24* (2009.01)
*H04W 52/36* (2009.01)

(52) U.S. Cl.
CPC ............ *H04L1/1678* (2013.01); *H04L 1/1812* (2013.01); *H04L 1/1887* (2013.01); *H04L 5/0055* (2013.01); *H04W 52/143* (2013.01); *H04W 52/146* (2013.01); *H04W 52/325* (2013.01); *H04W 52/48* (2013.01); *H04W 72/1284* (2013.01); *H04L 1/0031* (2013.01); *H04L 1/0073* (2013.01); *H04L 1/1692* (2013.01); *H04W 52/242* (2013.01); *H04W 52/367* (2013.01)

(56) References Cited

U.S. PATENT DOCUMENTS

| | | | |
|---|---|---|---|
| 2009/0207797 | A1 | 8/2009 | Shen et al. |
| 2010/0002664 | A1* | 1/2010 | Pan et al. ................ 370/338 |
| 2010/0137018 | A1 | 6/2010 | Xu |
| 2010/0195624 | A1 | 8/2010 | Zhang et al. |
| 2010/0246463 | A1* | 9/2010 | Papasakellariou et al. ... 370/311 |
| 2011/0205981 | A1* | 8/2011 | Koo et al. ................ 370/329 |
| 2012/0113907 | A1* | 5/2012 | Baldemair .......... H04W 52/325 370/329 |
| 2012/0113962 | A1* | 5/2012 | Jen .............................. 370/336 |

FOREIGN PATENT DOCUMENTS

| | | |
|---|---|---|
| JP | 2014-502088 | 1/2014 |
| KR | 10-2009-0086445 | 8/2009 |
| WO | 2010/005239 | 1/2010 |
| WO | 2012/154765 | 11/2012 |

OTHER PUBLICATIONS

3GPP "LTE; Evolved Universal Terrestrial Radio Access (E-UTRA); Medium Access Control (MAC) protocol specification (Release 9)" 3GPP TS 36.321 V9.0.0, Oct. 2009.*

Motorola, "Change Request 36.213 CR 270" R1-106557, Nov. 15, 2010.*

Nokia, "On the PUCCH Multiplexing Combinations for CA" R1-103791, Jun. 28, 2010.*

Samsung "Concurrent transmission of Scheduling Request indicator and ACK/NACK information for LTE-Advanced" R1-103643, Jun. 28, 2010.*

Panasonic "Simultaneous transmission of Scheduling request indicator and ACK/NACK information for LTE-Advanced" R1-103757, Jun. 28, 2010.*

Panasonic "Simultaneous transmission of Scheduling request indicator and ACK/NACK information for LTE-Advanced" R1-102026, Apr. 12, 2010.*

Panasonic "Simultaneous transmission of Scheduling request indicator and ACK/NACK information for LTE-Advanced" R1-102862, May 10, 2010.*

Panasonic "Simultaneous transmission of Scheduling request indicator and ACK/NACK information for LTE-Advanced" R1-104890, Aug. 23, 2010.*

Panasonic "Simultaneous transmission of Scheduling request indicator and ACK/NACK information for LTE-Advanced" R1-105481, Oct. 11, 2010.*

Huawei "Simultaneous transmission of SRI and ACK/NACK" R1-105124, Oct. 11, 2010.*

3GPP "Technical Specification Group Radio Access Network; Evolved Universal Terrestrial Radio Access (E-UTRA); Physical layer procedures (Release 10)." 3GPP TS 36.213 Jun. 22, 2011.*

ZTE, "Power control of PUCCH for LTE-A TDD," 3GPP TSG-RAN WG1 #64, R1-110984, Feb. 2011, 4 pages.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.2.0, Jun. 2011, pp. 1-8, 15-18, 92-94.

"LTE; Evolved Universal Terrestrial Radio Access (E-UTRA); Physical Layer procedures (3GPP TS 36.213 version 10.2.0 Release 10)", Jun. 2011, XP-014066384.

3rd Generation Partnership Project (3GPP), "Technical Specification Group Radio Access Network; Evolved Universal Terrestrial Radio Access (E-UTRA); Physical layer procedures (Release 10)", 3GPP TS 36.213 V10.0.0, Dec. 2010, XP-050462367.

3rd Generation Partnership Project (3GPP), "Technical Specification Group Radio Access Network; Evolved Universal Terrestrial Radio Access (E-UTRA); Physical layer procedures (Release 9)", Draft 3GPP TS 36.213 V9.3.0, Sep. 2010, XP-050448693.

Samsung, "Discussion on concurrent transmission of SRI and CA ACK/NACK information for LTE-Advanced", R1-105366, 3GPP TSG RAN WG1 #62bis, Oct. 2010.

Samsung, "PUCCH Power Control for DL CA", R1-105367, 3GPP TSG RAN WG1 #62bis, Oct. 2010.

Samsung, "Cross-carrier Group UL PC for LTE-A", R1-105370, 3GPP TSG RAN WG1 Meeting #62bis, Oct. 2010.

Samsung, "Discussion on multiplexing SRS and PUSCH in an SC-FDMA symbol in carrier-aggregated system", R1-105376, 3GPP TSG RAN WG1 #62bis, Oct. 2010.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.0.1, Dec. 2010, 5 pages.

* cited by examiner

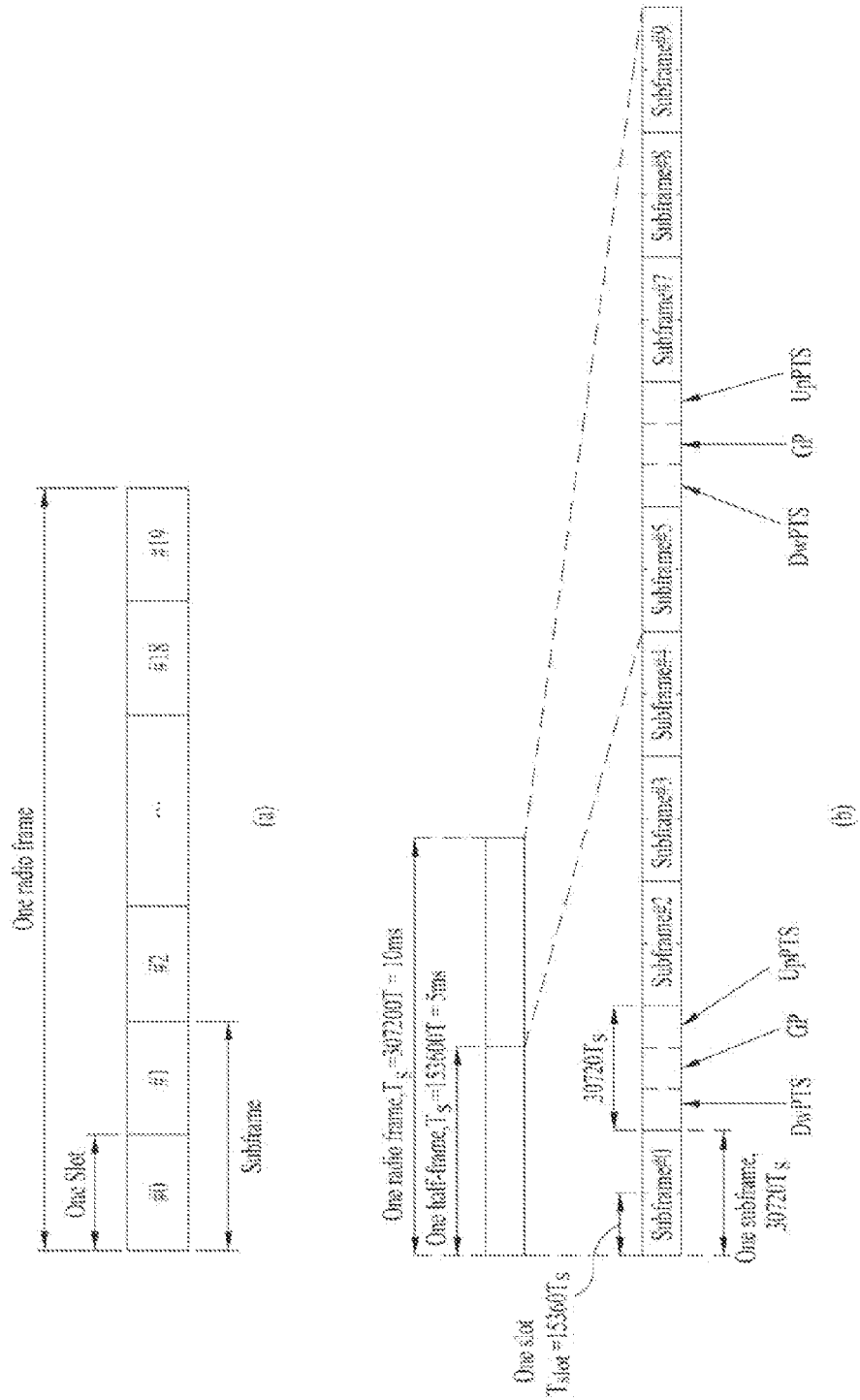

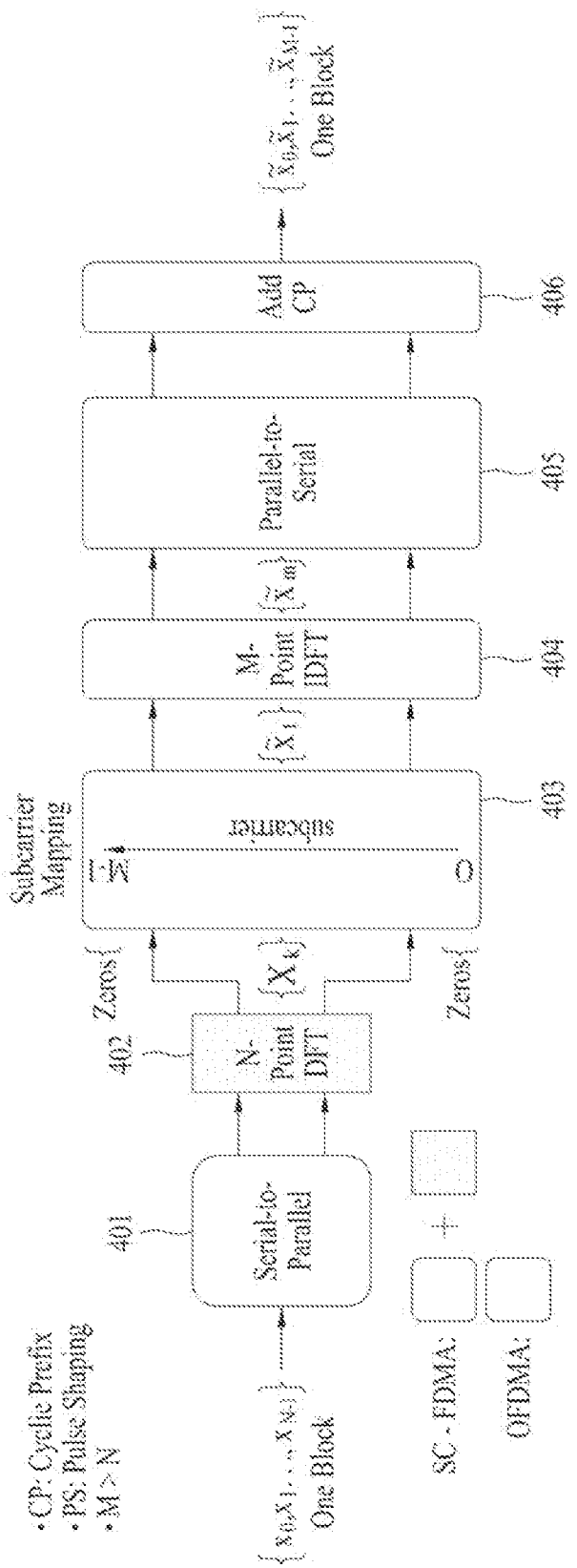

FIG. 5
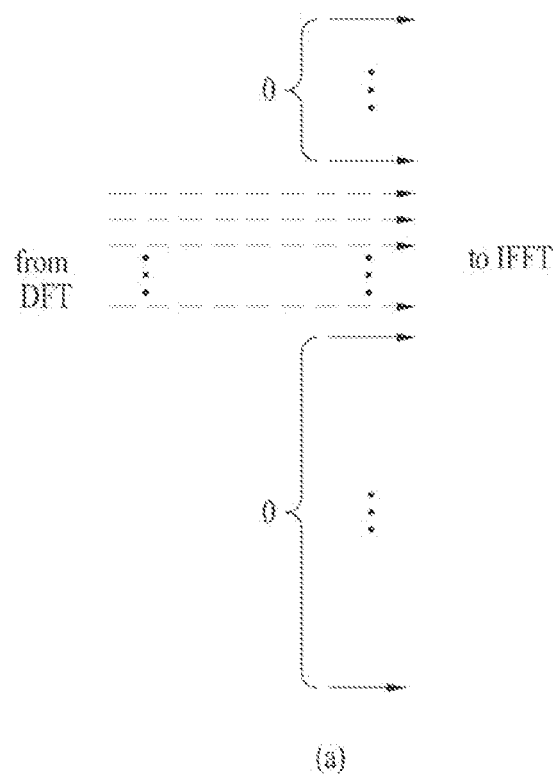
(a)
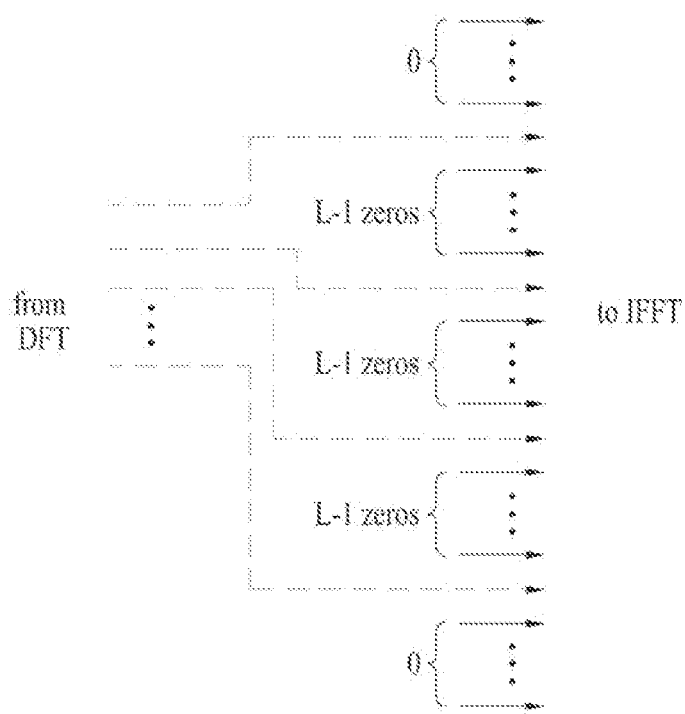
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$ RS orthogonal cover

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\overline{n}_{OC}=0$ | $\overline{n}_{OC}=1$ | $\overline{n}_{OC}=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | 13 | | 6 | 13 |
| 3 | 2 | 1 | 7 | 14 | 1 | 7 | 14 |
| 4 | 3 | | 8 | 15 | | 8 | 15 |
| 5 | 4 | 2 | 9 | 16 | 2 | 9 | 16 |
| 6 | 5 | 3 | 10 | 17 | 3 | 10 | 17 |
| 7 | 6 | | 11 | | | 11 | |
| 8 | 7 | 4 | | | 4 | | |
| 9 | 8 | 5 | | | 5 | | |
| 10 | 9 | | | | | | |
| 11 | 10 | | | | | | |
| 0 | 11 | | | | | | |

$\Delta_{shift}^{PUCCH} \in \{1,2,3\}$ for normal cyclic prefix
$\Delta_{shift}^{PUCCH} \in \{1,2,3\}$ for extended cyclic prefix
$\delta_{offset}^{PUCCH} \in \{0,1,...,\Delta_{shift}^{PUCCH}-1\}$ Cell specific cyclic shift offset $n_{OC}$ Orthogonal sequence index for ACK/NACK
$\overline{n}_{OC}$ Orthogonal sequence index for RS
$n_{CS}$ Cyclic shift value of a CAZAC sequence
n' ACK/NACK resource index used for the channelization in a RB

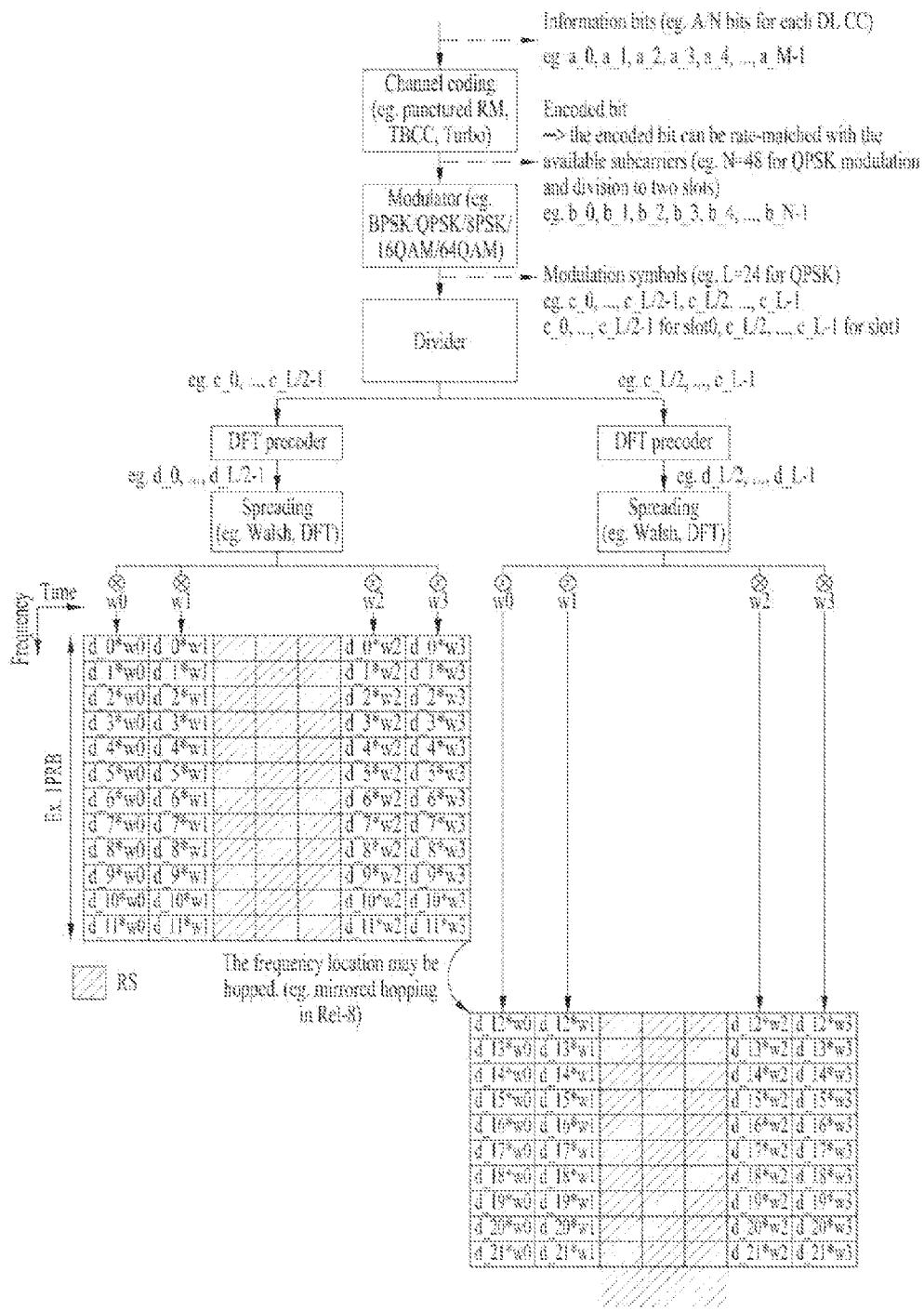

METHOD AND APPARATUS FOR TRANSMITTING CONTROL INFORMATION IN A WIRELESS COMMUNICATION SYSTEM

CROSS-REFERENCE TO RELATED APPLICATIONS

This application is a continuation of U.S. patent application Ser. No. 13/279,215, filed on Oct. 21, 2011,now U.S Pat. No. 8,755,343, which claims the benefit of earlier filing date and right of priority to Korean Patent Application No. 10-2011-0103023, filed on Oct. 10, 2011 and also claims the benefit of U.S. Provisional Patent Application No. 61/444,770, filed on Feb. 20, 2011, U.S. Provisional Patent Application No. 61/409,118, filed on Nov. 2, 2010, and 61/405,624, filed on Oct. 21, 2010, the contents of which are all hereby incorporated by reference herein in their entirety.

DESCRIPTION

1. Technical Field

The present invention relates to a wireless communication system, and more particularly, to a method and apparatus for transmitting control information in a wireless communication system supporting carrier aggregation (CA).

2. Background Art

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention is to provide a method and apparatus for efficiently transmitting control information in a wireless communication system. Another object of the present invention is to provide a channel format and a signal processing method and apparatus for efficiently transmitting control information. Another object of the present invention is to provide a method and apparatus for efficiently allocating resources used to transmit control information.

The technical problems solved by the present invention are not limited to the above technical problems and those skilled in the art can understand other technical problems from the following description.

Technical Solution

To achieve these objects and other advantages and in accordance with the purpose of the invention, as embodied and broadly described herein, a method for transmitting a physical uplink control channel (PUCCH) signal by a communication apparatus in a wireless communication system includes setting transmit power for the PUCCH signal. If the PUCCH signal is transmitted on a subframe configured for a scheduling request (SR), the PUCCH signal includes one or more hybrid automatic repeat request acknowledgement (HARQ-ACK) bits and an SR bit, and the transmit power for the PUCCH is determined by using the following equation:

$$h(\cdot) = \frac{n_{HARQ} + n_{SR} - 1}{N}$$

where, $n_{HARQ}$ is associated with the number of information bits of HARQ-ACK, N denotes a positive integer, and $n_{SR}$ is 1 when a transport block for an uplink shared channel (UL-SCH) is not present at the subframe and is 0 when the transport block for the UL-SCH is present at the subframe.

In another aspect of the present invention, a communication apparatus configured to transmit a physical uplink control channel (PUCCH) signal in a wireless communication system includes a radio frequency (RF) unit, and a processor configured to set transmit power for the PUCCH signal. If the PUCCH signal is transmitted on a subframe configured for a scheduling request (SR), the PUCCH signal includes one or more hybrid automatic repeat request acknowledgement (HARQ-ACK) bits and an SR bit, and the transmit power for the PUCCH is determined by using the following equation:

$$h(\cdot) = \frac{n_{HARQ} + n_{SR} - 1}{N}$$

where, $n_{HARQ}$ is associated with the number of information bits of HARQ-ACK, N denotes a positive integer, and $n_{SR}$ is 1 when a transport block for an uplink shared channel (UL-SCH) is not present at the subframe and is 0 when the transport block for the UL-SCH is present at the subframe.

The transmit power for the PUCCH signal at a subframe i may be determined by using the following equation:

$$P_{PUCCH}(i) = \min \begin{cases} P_{CMAX,c}(i), \\ P_{0\_PUCCH} + PL_c + h(\cdot) + \Delta_{F\_PUCCH}(F) + \Delta_{TxD}(F') + g(i) \end{cases}$$

where, $P_{PUCCH}(i)$ denotes transmit power for the PUCCH, $P_{CMAX,c}(i)$ denotes maximum transmit power configured for a serving cell c, $P_{0\_PUCCH}$ denotes a parameter configured by a higher layer, $PL_c$ denotes a downlink path loss estimation value of the serving cell c, $\Delta_{F\_PUCCH}(F)$ denotes a value corresponding to a PUCCH format, $\Delta_{TxD}(F')$ denotes a value configured by the higher layer or 0, and g(i) denotes a current PUCCH power control adjustment state.

If a transport block for an uplink shared channel (UL-SCH) is not present in the subframe, the SR bit indicates actual SR information and, if a transport block for an uplink shared channel (UL-SCH) is present in the subframe, the SR bit indicates dummy information. The dummy information may have a predetermined value. For example, if the SR bit indicates dummy information, the SR bit may be set to a predetermined value of 0 or 1 and may be preferably set to 0.

The SR bit may be attached to the end of the one or more HARQ-ACK bits.

The SR bit may be set to 1 in case of a positive SR and may be set to 0 in case of a negative SR.

The one or more HARQ-ACK bits and the SR bit may be joint-coded.

The communication apparatus may be configured with a simultaneous PUCCH-and-physical uplink shared channel (PUSCH) transmission mode.

N may be 2 or 3.

The one or more HARQ-ACK bits and the SR bit may be joint-coded.

The PUCCH signal may be a PUCCH format 3 signal.

Advantageous Effects

According to the present invention, it is possible to efficiently transmit control information in a wireless communication system. In addition, it is possible to provide a channel format and a signal processing method for efficiently transmitting control information. In addition, it is possible to efficiently allocate resources used to transmit control information.

The effects of the present invention are not limited to the above-described effects and those skilled in the art can understand other effects from the following description.

DESCRIPTION OF DRAWINGS

The accompanying drawings which are included as a portion of the detailed description in order to help understanding of the present invention provide embodiments of the present invention and describes technical mapping of the present invention along with the detailed description.

FIG. 2 is a diagram showing a structure of a radio frame.

FIG. 4 is a diagram showing a Single Carrier Frequency Division Multiple Access (SC-FDMA) scheme and an Orthogonal Frequency Division Multiple Access (OFDMA) scheme.

FIG. 5 is a diagram showing a signal mapping scheme on a frequency domain satisfying a single carrier property.

FIG. 17 is a diagram showing ACK/NACK channelization of PUCCH formats 1a and 1b.

FIGS. 29A to 29F are diagrams showing a structure of PUCCH format 3 and a signal processing procedure therefor.

MODE FOR INVENTION

The following technologies may be utilized in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A $3^{rd}$ Generation Partnership Project Long Term Evolution (3GPP LTE) communication system is part of the E-UMTS (Evolved UMTS), which employs an OFDMA system in downlink and employs an SC-FDMA system in uplink. LTE-A (Advanced) is an evolved version of 3GPP LTE. In order to clarify the description, the 3GPP LTE/LTE-A will be focused upon, but the technical scope of the present invention is not limited thereto.

In a wireless communication system, a user equipment (UE) receives information from a base station (BS) in the downlink (DL) and transmits information to the BS in the uplink (UL). Information transmitted and received between the BS and the UE includes data and a variety of control information, and various physical channels are present according to the kind/usage of the transmitted and received information.

Figure 1:
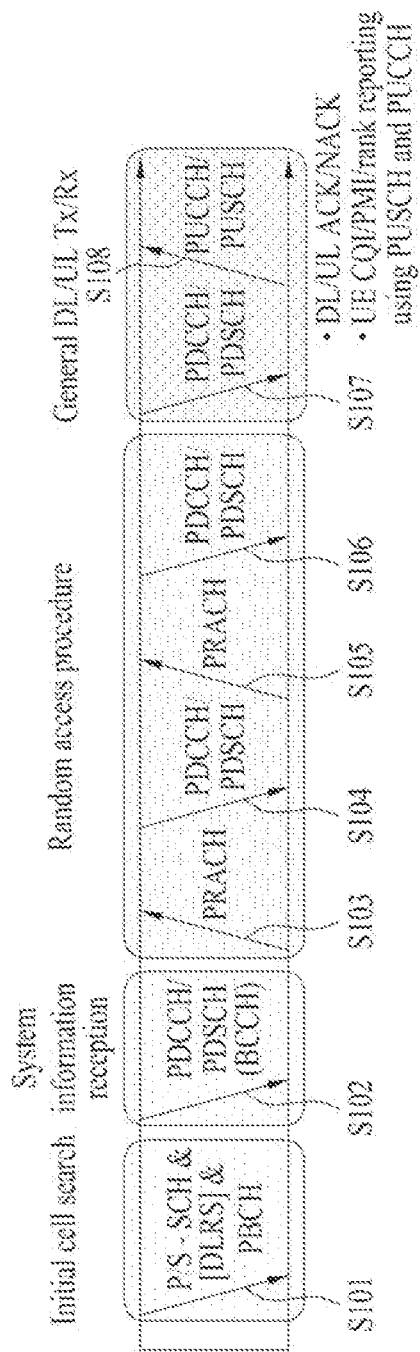
FIG. 1 is a view showing physical channels used for a $3^{rd}$ Generation Partnership Project (3GPP) Long Term Evolution (LTE) system, which is an example of a wireless communication system, and a general signal transmission method using the same.

FIG. 1 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the eNB. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure. Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality indication (CQI), precoding matrix indication (PMI), rank indication (RI), etc. The UCI is generally transmitted via a PUCCH. However, in the case where control information and traffic data are simultaneously transmitted, the UCI may be transmitted via a PUSCH. The UCI may be aperiodically transmitted via a PUSCH according to a network request/instruction.

FIG. 2 exemplarily shows a radio frame structure. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms.

One slot may include a plurality of OFDM symbols in a time region and include a plurality of Resource Blocks (RBs) in a frequency region. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 2(b). The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 3A:
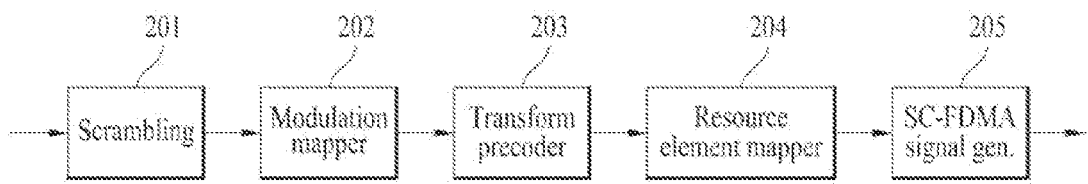
FIG. 3A is a diagram showing an uplink signal processing procedure.

FIG. 3a is a view explaining a signal processing procedure of transmitting a UL signal at a UE.

In order to transmit the UL signal, a scrambling module 201 of the UE may scramble a transmitted signal using a UE-specific scrambling signal. The scrambled signal is input to a modulation mapper 202 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 203 and are input to a resource element mapper 204. The resource element mapper 204 may map the complex symbols to time-frequency resource elements. The processed signal may be transmitted to the BS via an SC-FDMA signal generator 205 and an antenna.

Figure 3B:
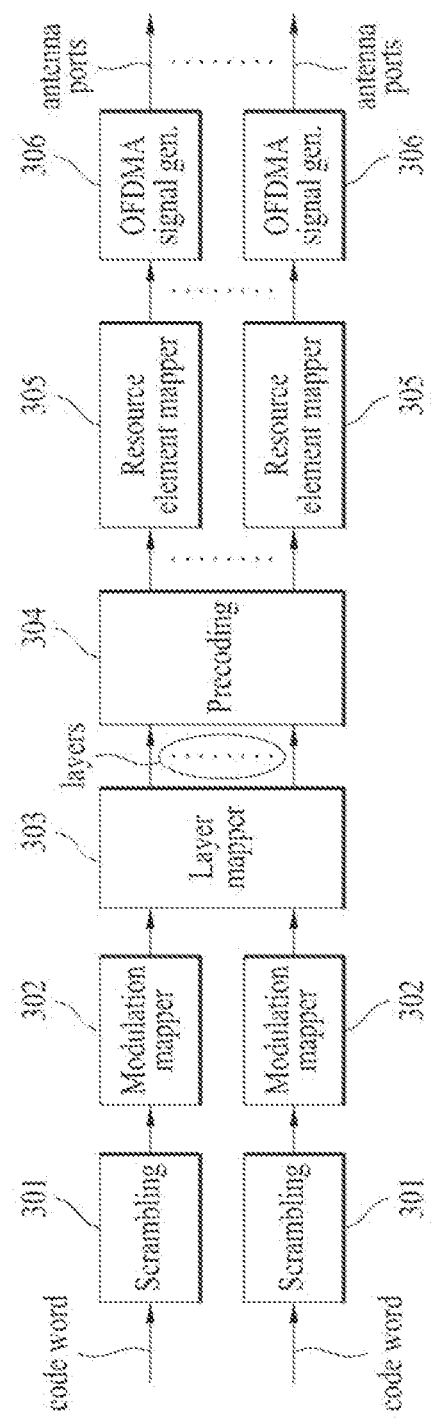
FIG. 3B is a diagram showing a downlink signal processing procedure.

FIG. 3b is a diagram explaining a signal processing procedure of transmitting a downlink (DL) signal at a BS.

In a 3GPP LTE system, the BS may transmit one or more codewords in the downlink. Accordingly, one or more codewords may be processed to configure complex symbols by scrambling modules 301 and modulation mappers 302, similar to the UL transmission of FIG. 3a. Thereafter, the complex symbols are mapped to a plurality of layers by a layer mapper 303, and each layer may be multiplied by a precoding matrix by a precoding module 304 and may be allocated to each transmission antenna. The processed signals which will respectively be transmitted via antennas may be mapped to time-frequency resource elements by resource element mappers 305, and may respectively be transmitted via OFDM signal generators 306 and antennas.

In a wireless communication system, in a case where a UE transmits a signal in the uplink, a Peak-to-Average Ratio (PAPR) may be more problematic than the case where a BS transmits a signal in the downlink. Accordingly, as described above with reference to FIGS. 2 and 3, an OFDMA scheme is used to transmit a downlink signal, while an SC-FDMA scheme is used to transmit an uplink signal.

FIG. 4 is a diagram explaining an SC-FDMA scheme and an OFDMA scheme. In the 3GPP system, the OFDMA scheme is used in the downlink and the SC-FDMA is used in the uplink.

Referring to FIG. 4, a UE for UL signal transmission and a BS for DL signal transmission are identical in that a serial-to-parallel converter 401, a subcarrier mapper 403, an M-point Inverse Discrete Fourier Transform (IDFT) module 404, parallel-to-serial converter 405 and a Cyclic Prefix (CP) adding module 406 are included. The UE for transmitting a signal using an SC-FDMA scheme further includes an N-point DFT module 402. The N-point DFT module 402 partially offsets an IDFT process influence of the M-point IDFT module 404 such that the transmitted signal has a single carrier property.

FIG. 5 is a diagram explaining a signal mapping scheme in a frequency domain satisfying the single carrier property in the frequency domain. FIG. 5(a) shows a localized mapping scheme and FIG. 5(b) shows a distributed mapping scheme.

A clustered SC-FDMA scheme which is a modified form of the SC-FDMA scheme will now be described. In the clustered SC-FDMA scheme, DFT process output samples are divided into sub-groups in a subcarrier mapping process and are non-contiguously mapped in the frequency domain (or subcarrier domain).

Figure 6:
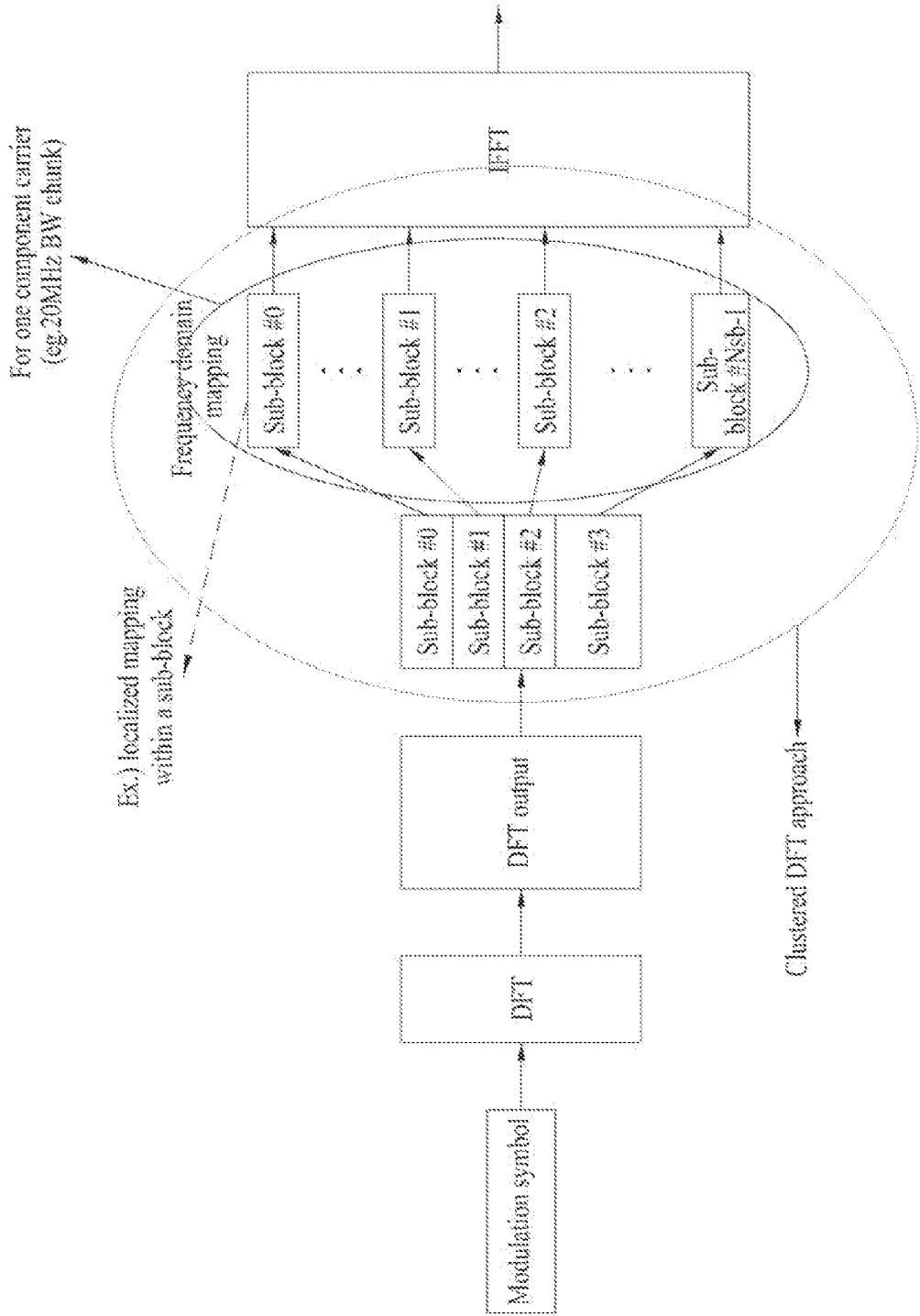
FIG. 6 is a diagram showing a signal processing procedure of mapping DFT process output samples to a single carrier in a clustered SC-FDMA.
Figure 7:
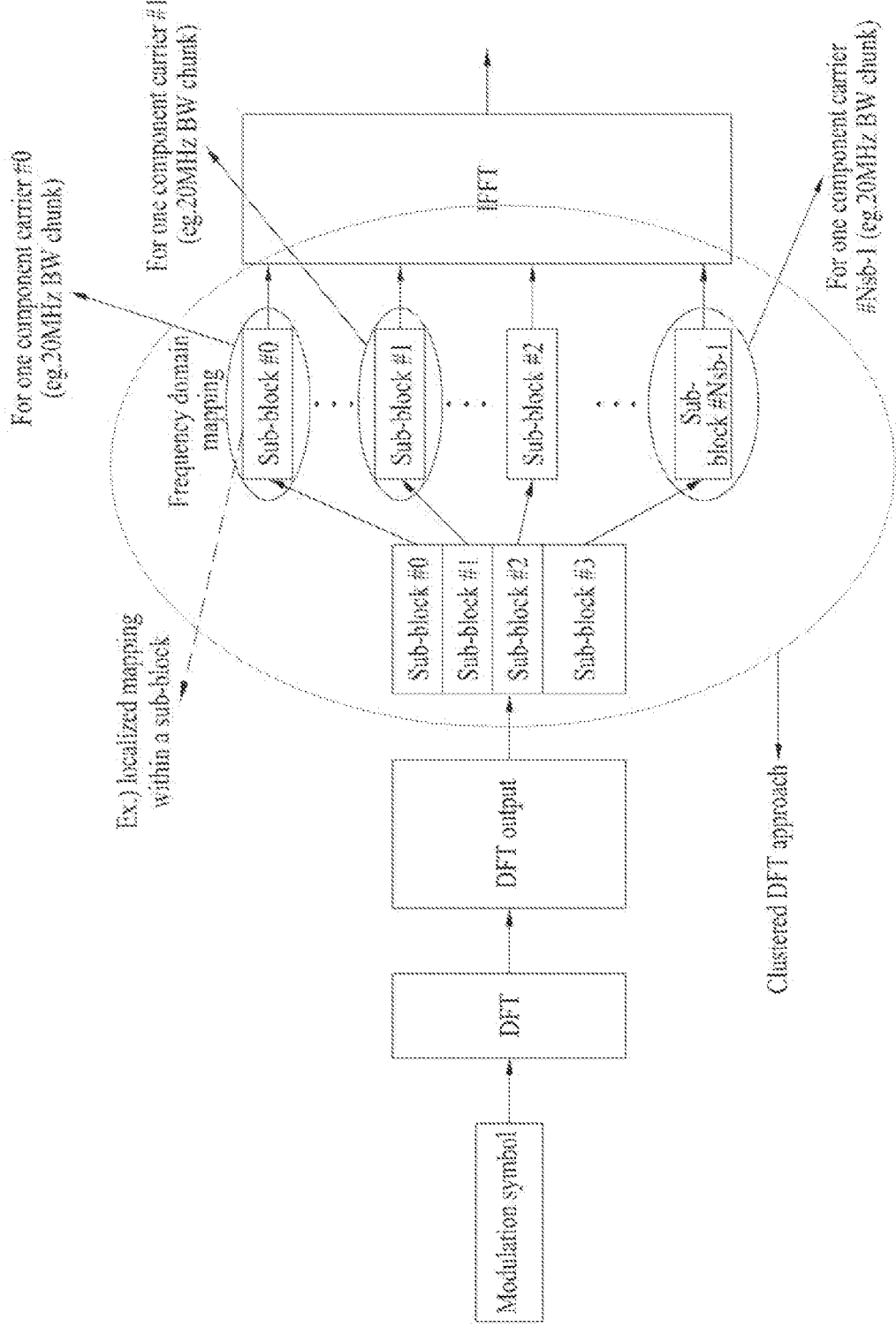
FIGS. 7 and 8 are diagrams showing a signal processing procedure of mapping DFT process output samples to multiple carriers in a clustered SC-FDMA scheme.
Figure 8:
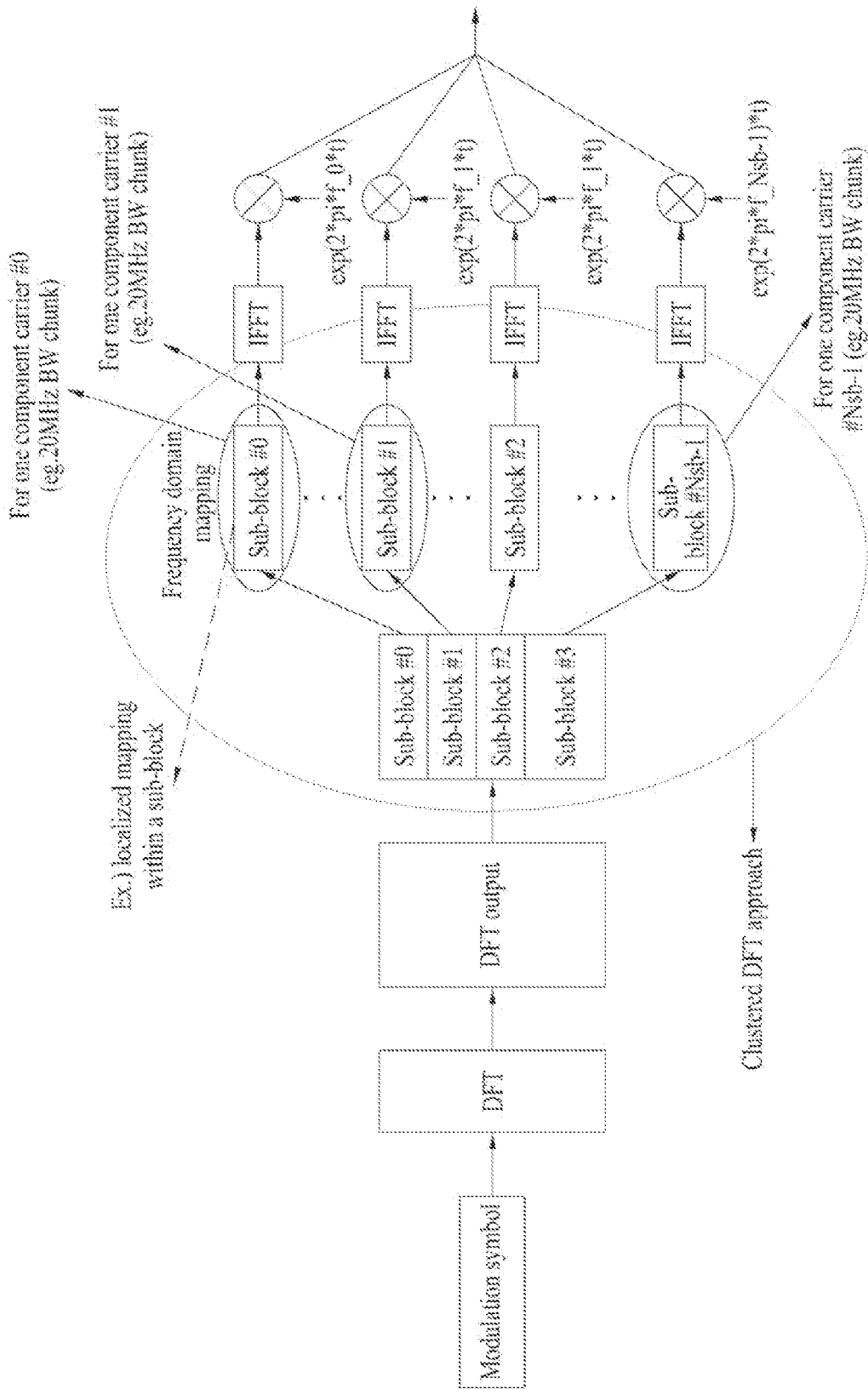

FIG. 6 is a diagram showing a signal processing procedure in which DFT process output samples are mapped to a single carrier in a clustered SC-FDMA scheme. FIGS. 7 and 8 are diagrams showing a signal processing procedure in which DFT process output samples are mapped to multiple carriers in a clustered SC-FDMA scheme. FIG. 6 shows an example of applying an intra-carrier clustered SC-FDMA scheme and FIGS. 7 and 8 show examples of applying an inter-carrier clustered SC-FDMA scheme. FIG. 7 shows the case where a subcarrier spacing between contiguous component carriers is set and a signal is generated by a single IFFT block in a state in which component carriers are contiguously allocated in a frequency domain and FIG. 8 shows the case where a signal is generated by a plurality of IFFT blocks in a state in which component carriers are non-contiguously allocated in a frequency domain.

Figure 9:
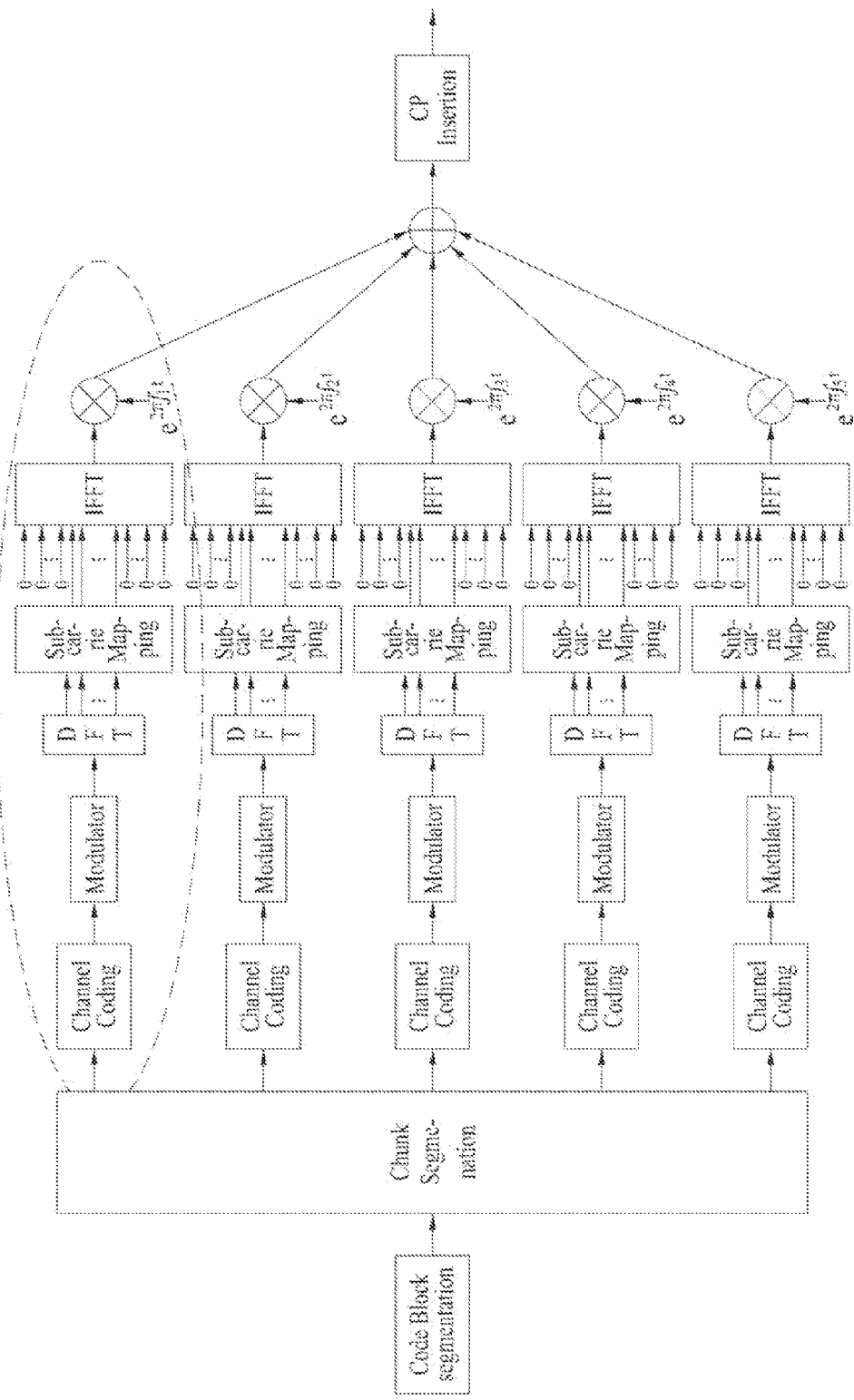
FIG. 9 is a diagram showing a signal processing procedure in a segmented SC-FDMA scheme.

FIG. 9 is a diagram showing a signal processing procedure in a segmented SC-FDMA scheme.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme also referred to as an NxSC-FDMA or NxDFT-s-OFDMA scheme. In the present invention, the generic term "segmented SC-FDMA" is used. Referring to FIG. 9, the segmented SC-FDMA scheme is characterized in that modulation symbols of an entire time domain are grouped into N (N is an integer greater than 1) groups and a DFT process is performed on a group unit basis, in order to relax a single carrier property.

Figure 10:
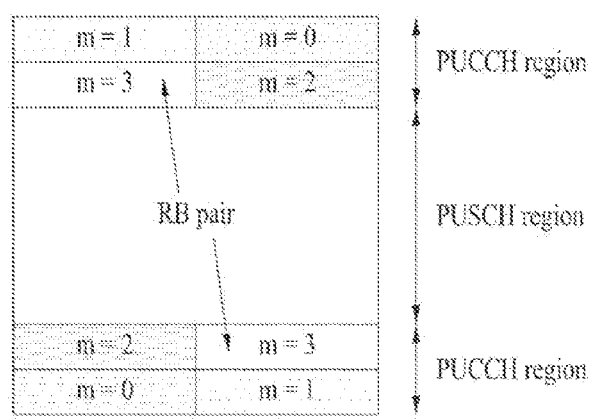
FIG. 10 is a diagram showing the structure of an uplink subframe.

FIG. 10 is a diagram showing the structure of a UL subframe.

Referring to FIG. 10, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The UL control information (that is, UCI) includes HARQ ACK/NACK, Channel Quality Information (CQI), Precoding Matrix Indicator (PMI) and Rank Indication (RI).

Figure 11:
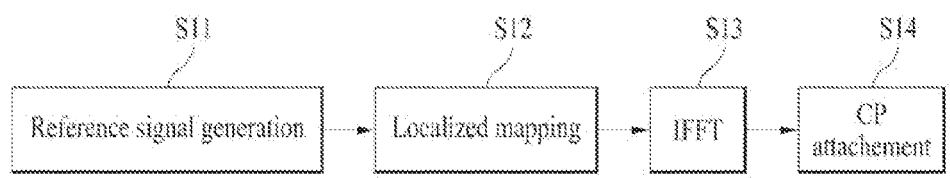
FIG. 11 is a diagram showing a signal processing procedure of transmitting a reference signal (RS) in the uplink.

FIG. 11 is a diagram illustrating a signal processing procedure for transmitting a Reference Signal (RS) in the uplink. As shown in FIG. 11, data is transformed into a frequency domain signal by a DFT precoder, subjected to frequency mapping and IFFT, and transmitted. In contrast, an RS does not pass through a DFT precoder. More specifically, an RS sequence is directly generated in a frequency domain (step 11), subjected to a localized-mapping process (step 12), subjected to IFFT (step 13), subjected to a CP attachment process (step 14), and transmitted.

The RS sequence $r_{u,v}^{(\alpha)}(n)$ is defined by cyclic shift $\alpha$ of a base sequence and may be expressed by Equation 1.

$$r_{u,v}^{(\alpha)}(n) = e^{j\alpha n} \bar{r}_{u,v}(n), \ 0 \leq n < M_{sc}^{RS} \quad \text{Equation 1}$$

where, $M_{sc}^{RS} = mN_{sc}^{RB}$ denotes the length of the RS sequence, $N_{sc}^{RB}$ denotes the size of a resource block represented in subcarrier units, and m is $1 \leq m \leq N_{RB}^{max, \ UL}$. $N_{RB}^{max, \ UL}$ denotes a maximum UL transmission band.

A base sequence $\bar{r}_{u,v}(n)$ is grouped into several groups. $u \in \{0, 1, \ldots, 29\}$ denotes a group number, and v corresponds to a base sequence number in a corresponding group. Each group includes one base sequence v=0 with a length of $M_{sc}^{RS} = mN_{sc}^{RB}$ ($1 \leq m \leq 5$) and two base sequences v=0, 1 with a length of $M_{sc}^{RS} = mN_{sc}^{RB}$ ($6 \leq m \leq N_{RB}^{max, \ UL}$). The sequence group number u and the number v within a corresponding group may be changed with time. Definition of the base sequence $\bar{r}_{u,v}(0), \ldots, \bar{r}_{u,v}(M_{sc}^{RS}-1)$ follows a sequence length $M_{sc}^{RS}$.

The base sequence having a length of $3N_{sc}^{RB}$ or more may be defined as follows.

With respect to $M_{sc}^{RS} \geq 3N_{sc}^{RB}$, the base sequence $\bar{r}_{u,v}(0), \ldots, \bar{r}_{u,v}(M_{sc}^{RS}-1)$ is given by the following Equation 2.

$$\bar{r}_{u,v}(n) = x_q(n \bmod N_{ZC}^{RS}), \ 0 \leq n < M_{sc}^{RS} \quad \text{Equation 2}$$

where, a q-th root Zadoff-Chu sequence may be defined by the following Equation 3.

$$x_q(m) = e^{-j\frac{\pi q m(m+1)}{N_{ZC}^{RS}}}, \ 0 \leq m \leq N_{ZC}^{RS} - 1 \quad \text{Equation 3}$$

where, q satisfies the following equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{Equation 4}$$

where, the length $N_{ZC}^{RS}$ of the Zadoff-Chue sequence is given by a largest prime number and thus $N_{ZC}^{RS} < M_{sc}^{RS}$ is satisfied.

A base sequence having a length of less than $3N_{sc}^{RB}$ may be defined as follows. First, with respect to $M_{sc}^{RS} = N_{sc}^{RB}$ and $M_{sc}^{RS} = 2N_{sc}^{RB}$, the base sequence is given as shown in Equation 5.

$$\bar{r}_{u,v}(n) = e^{j\phi(n)\pi/4}, 0 \le n \le M_{sc}^{RS} - 1 \quad \text{Equation 5}$$

where, values $\phi(n)$ for $M_{sc}^{RS} = N_{sc}^{RB}$ and $M_{sc}^{RS} = 2N_{sc}^{RB}$ are given by the following Table 1, respectively.

TABLE 1

| u | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | -1 | -1 | -3 | -1 | 3 | 1 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

TABLE 1-continued

| u | $\phi(0), \ldots, \phi(11)$ | | | | | | | | | | | |
|---|---|---|---|---|---|---|---|---|---|---|---|---|
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

RS hopping will now be described.

The sequence group number u in a slot $n_s$ may be defined as shown in the following Equation 6 by a group hopping pattern $f_{gh}(n_s)$ and a sequence shift pattern $f_{ss}$.

$$u = (f_{gh}(n_s) + f_{ss}) \bmod 30 \quad \text{Equation 6}$$

where, mod denotes a modulo operation.

17 different hopping patterns and 30 different sequence shift patterns are present. Sequence group hopping may be enabled or disabled by a parameter for activating group hopping provided by a higher layer.

A PUCCH and a PUSCH may have the same hopping pattern, but have different sequence shift patterns.

The group hopping pattern $f_{gh}(n_s)$ is the same in the PUSCH and the PUCCH and is given by the following Equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{Equation 7}$$

where, c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The PUCCH and the PUSCH are different in definition of the sequence shift pattern $f_{ss}$.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0,1,\ldots,29\}$ is configured by a higher layer.

Hereinafter, sequence hopping will be described.

Sequence hopping is applied only to a RS having a length of $M_{sc}^{RS} \geq 6N_{sc}^{RB}$.

With respect to an RS having a length of $M_{sc}^{RS} < 6N_{sc}^{RB}$, a base sequence number v within a base sequence group is v=0.

With respect to an RS having a length of $M_{sc}^{RS} \geq 6N_{sc}^{RB}$, a base sequence number v within a base sequence group in a slot $n_s$ is given by the following Equation 8.

$$v = \begin{cases} c(n_s) & \text{if group hopping is disabled} \\ & \text{and sequence hopping is enabled} \\ 0 & \text{otherwise} \end{cases} \quad \text{Equation 8}$$

where, c(i) denotes a pseudo-random sequence and a parameter for enabling sequence hopping provided by a higher layer determines whether sequence hopping is enabled. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined as follows.

The RS sequence $r^{PUSCH}(\cdot)$ for the PUCCH is defined by $r^{PUSCH}(m \cdot M_{sc}^{RS} + n) = r_{u,v}^{(\alpha)}(n)$. m and n satisfy $$m = 0, 1$$
$$n = 0, \ldots, M_{sc}^{RS} - 1$$

and satisfy $M_{sc}^{RS} = M_{sc}^{PUSCH}$.

In one slot, cyclic shift is $\alpha = 2\pi n_{cs}/12$ along with $n_{cs} = (n_{DMRS}^{(1)} + n_{DMRS}^{(2)} + n_{PRS}(n_s)) \bmod 12$.

$n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is $n_{PRS}(n_s) = \sum_{i=0}^{7} c(8 \cdot n_s + i) \cdot 2^i$.

c(i) is a pseudo-random sequence and c(i) is a cell-specific value. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same set of a physical resource block (PRB) used for the corresponding PUSCH within the sequence started at $r^{PUSCH}(0)$. l=3 for a normal CP and l=2 for an extended CP. When the sequence is mapped to a resource element (k, l) within a subframe, the order of k is first increased and the slot number is then increased.

In summary, if a length is greater than and equal to $3N_{sc}^{RB}$, a ZC sequence is used along with cyclic extension. If a length is less than $3N_{sc}^{RB}$, a computer-generated sequence is used. Cyclic shift is determined according to cell-specific cyclic shift, UE-specific cyclic shift and hopping pattern.

Figure 12A:
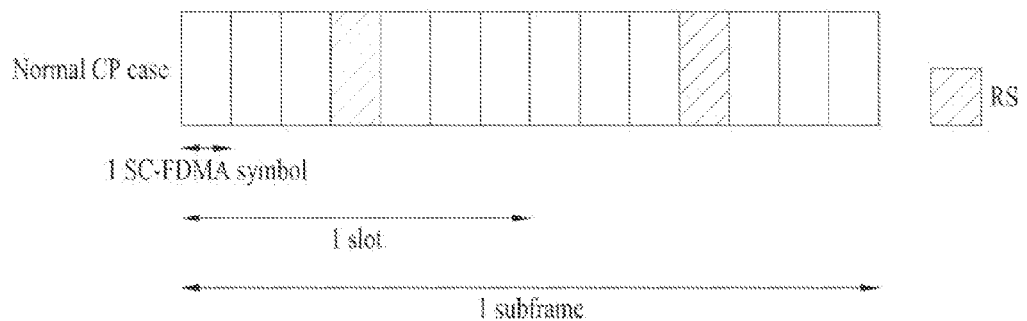
FIGS. 12A and 12B are diagrams showing a demodulation reference signal (DMRS) for a physical uplink shared channel (PUSCH).
Figure 12B:
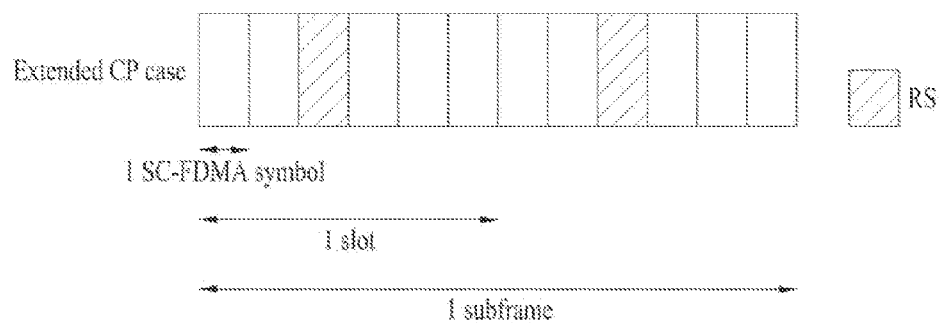

FIG. 12A is a diagram showing the structure of a demodulation reference signal (DMRS) for a PUSCH in the case of normal CP and FIG. 12B is a diagram showing the structure of a DMRS for a PUSCH in the case of extended CP. In FIG. 12A, a DMRS is transmitted via fourth and eleventh SC-FDMA symbols and, in FIG. 12B, a DMRS is transmitted via third and ninth SC-FDMA symbols.

FIGS. 13 to 16 show a slot level structure of a PUCCH format. The PUCCH includes the following formats in order to transmit control information.

(1) Format 1: This is used for on-off keying (OOK) modulation and scheduling request (SR)

(2) Format 1a and Format 1b: They are used for ACK/NACK transmission

1) Format 1a: BPSK ACK/NACK for one codeword

2) Format 1b: QPSK ACK/NACK for two codewords (3) Format 2: This is used for QPSK modulation and CQI transmission (4) Format 2a and Format 2b: They are used for CQI and ACK/NACK simultaneous transmission.

Table 4 shows a modulation scheme and the number of bits per subframe according to a PUCCH format. Table 5 shows the number of RSs per slot according to a PUCCH format. Table 6 shows SC-FDMA symbol locations of an RS according to a PUCCH format. In Table 4, the PUCCH formats 2a and 2b correspond to the normal CP case.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol location of RS | |
| | Normal CP | Extended CP |
|---|---|---|
| 1, 1a, 1b | 2, 3, 4 | 2, 3 |
| 2, 2a, 2b | 1, 5 | 3 |

Figure 13:
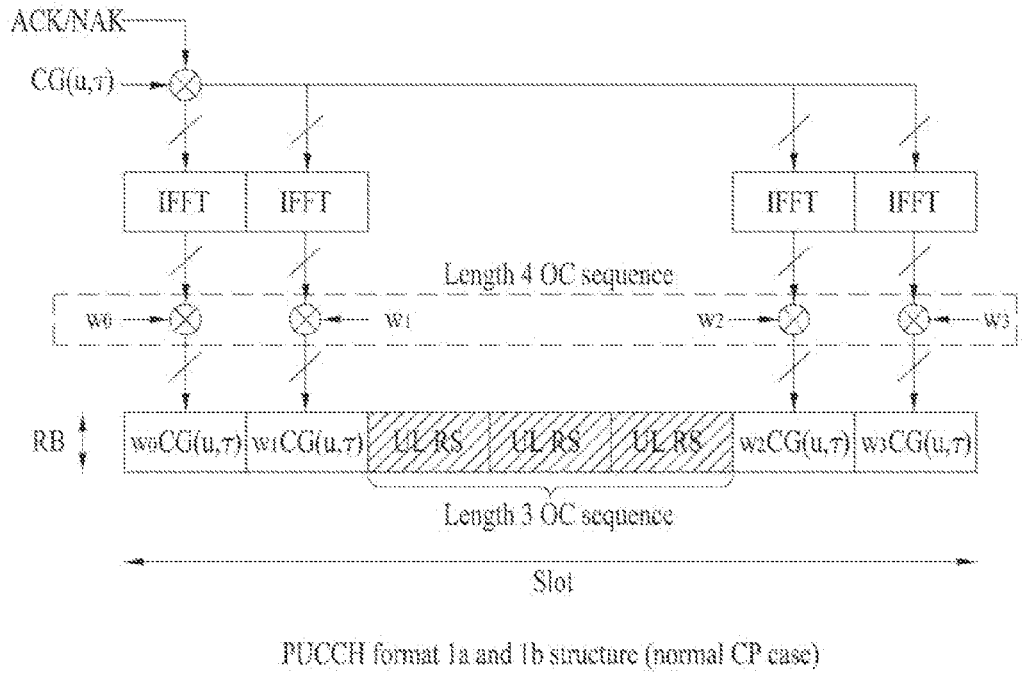
FIGS. 13 to 14 are diagrams showing slot level structures of physical uplink control channel (PUCCH) formats 1a and 1b.
Figure 14:
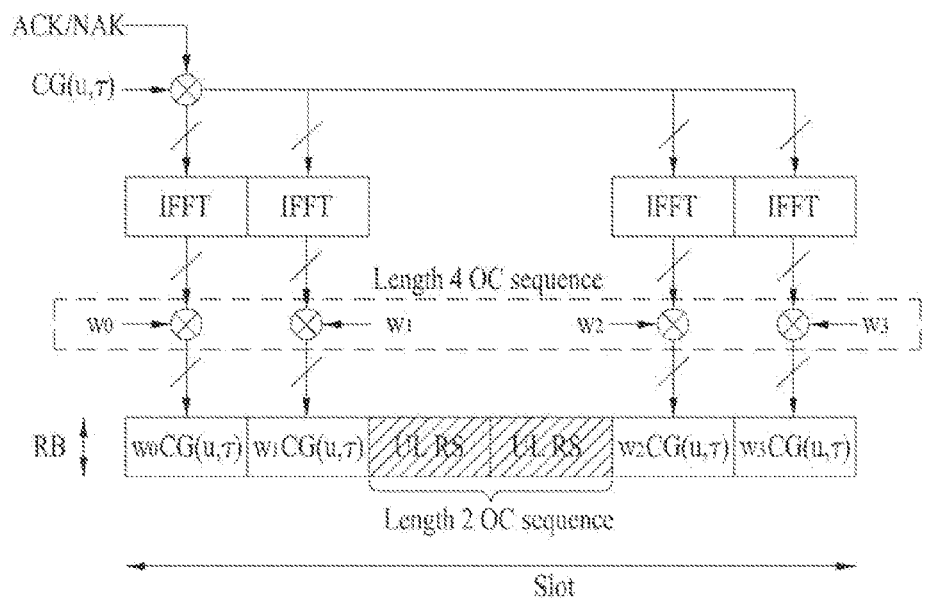

FIG. 13 shows PUCCH formats 1a and 1b in the normal CP case. FIG. 14 shows PUCCH formats 1a and 1b in the extended CP case. In the PUCCH formats 1a and 1b, the same control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in a PRB in the case of using a single antenna. Orthogonal sequences w0, w1, w2 and w3 may be applied in a certain time domain (after FFT modulation) or a certain frequency domain (before FFT modulation).

For SR and persistent scheduling, ACK/NACK resources including CSs, OCs and PRBs may be provided to a UE through radio resource control (RRC). For dynamic ACK/NACK and non-persistent scheduling, ACK/NACK resources may be implicitly provided to the UE by a lowest CCE index of a PDCCH corresponding to a PDSCH.

Figure 15:
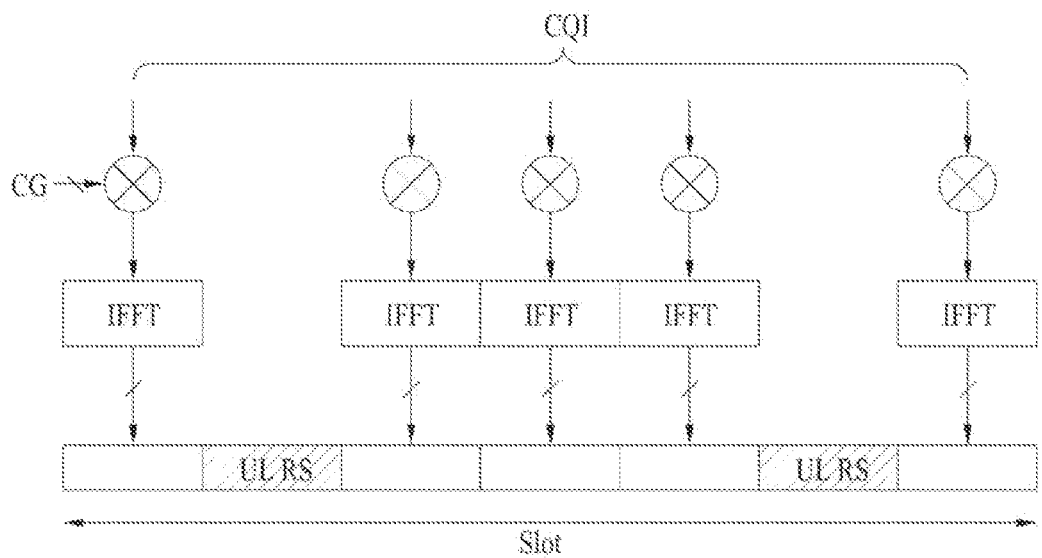
FIGS. 15 and 16 are diagrams showing slot level structures of PUCCH formats 2/2a/2b.
Figure 16:
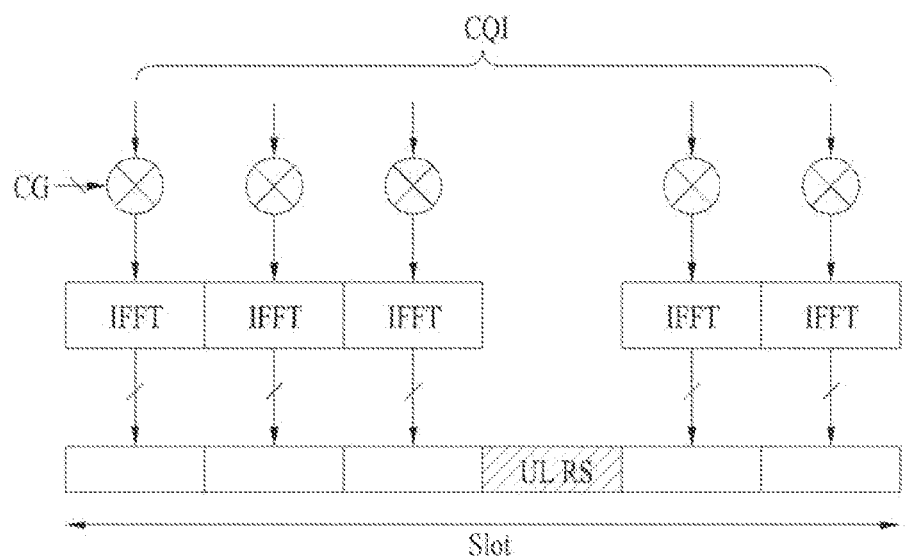

FIG. 15 shows a PUCCH format 2/2a/2b in the normal CP case. FIG. 16 shows a PUCCH format 2/2a/2b in the extended CP case. Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 7 and 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | $[1 \; e^{j2\pi/3} \; e^{j4\pi/3}]$ |
| 2 | $[1 \; e^{j4\pi/3} \; e^{j2\pi/3}]$ |

The OCs for the RS in the PUCCH formats 1/1a/1b is shown in Table 9.

TABLE 9

| | 1a and 1b | |
| Sequence index $\bar{n}_{oc}(n_s)$ | Normal cyclic prefix | Extended cyclic prefix |
|---|---|---|
| 0 | [1 1 1] | [1 1] |
| 1 | $[1 \; e^{j2\pi/3} \; e^{j4\pi/3}]$ | [1 −1] |
| 2 | $[1 \; e^{j4\pi/3} \; e^{j2\pi/3}]$ | N/A |

FIG. 17 is a diagram explaining ACK/NACK channelization for the PUCCH formats 1a and 1b. FIG. 17 shows the case of $\Delta_{shift}^{PUCCH}$-2.

Figure 18:
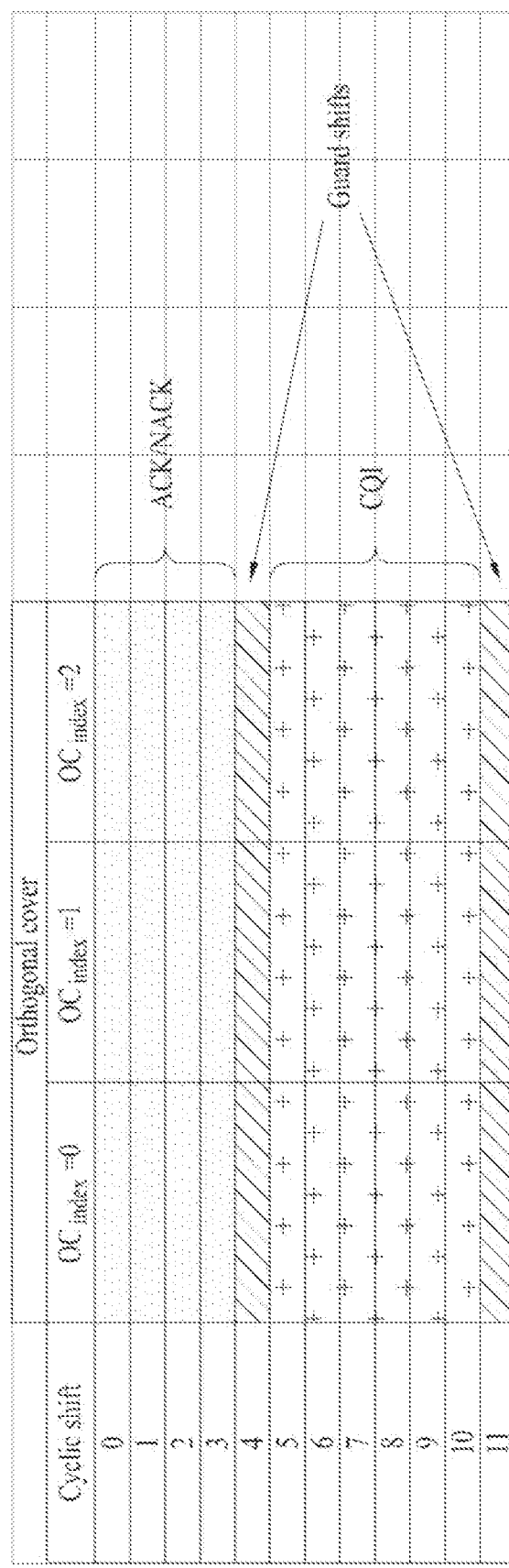
FIG. 18 is a diagram showing channelization of a structure in which PUCCH formats 1/1a/1b and formats 2/2a/2b are mixed within the same PRB.

FIG. 18 is a diagram showing channelization of a structure in which PUCCH formats 1/1a/1b and formats 2/2a/2b are mixed within the same PRB.

CS hopping and OC remapping may be applied as follows.

(1) Symbol-based cell-specific CS hopping for inter-cell interference randomization (2) Slot level CS/OC remapping 1) for inter-cell interference randomization 2) slot-based access for mapping between ACK/NACK channels and resources k Resource $n_r$ for the PUCCH format 1/1a/1b includes the following combination.

(1) CS(=DFT OC in a symbol level) ($n_{cs}$)

(2) OC (OC in a slot level) ($n_{oc}$)

(3) frequency RB ($n_{rb}$)

When indexes representing the CS, the OC and the RB are respectively $n_{cs}$, $n_{oc}$ and $n_{rb}$, a representative index $n_r$ includes $n_{cs}$, $n_{oc}$ and $n_{rb}$. $n_r$ satisfies $n_r=(n_{cs}, n_{oc}, n_{rb})$.

A CQI, a PMI, a RI, and a combination of a CQI and ACK/NACK may be transmitted through the PUCCH formats 2/2a/2b. Reed Muller (RM) channel coding may be applied.

For example, in an LTE system, channel coding for a UL CQI is described as follows. A bit sequence $a_0, a_1, a_2, a_3, \ldots a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, a maximum information bit number is 11 except for the case where the CQI and the ACK/NACK are simultaneously transmitted. After the bit sequence is coded to 20 bits using the RM code, QPSK modulation may be applied. Before QPSK modulation, coded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 0 | 1 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2 \qquad \text{Equation 9}$$

where, i=0, 1, 2, ..., B−1 is satisfied.

Table 11 shows an uplink control information (UCI) field for wideband report (single antenna port, transmit diversity or open loop spatial multiplexing PDSCH) CQI feedback.

TABLE 11

| Field | bandwidth |
|---|---|
| Wideband CQI | 4 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank >1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband report.

TABLE 13

| | Bit widths | | |
|---|---|---|---|
| | | 4 antenna ports | |
| Field | 2 antenna ports | Maximum of two layers | Maximum of four layers |
| RI (Rank Indication) | 1 | 1 | 2 |

Figure 19:
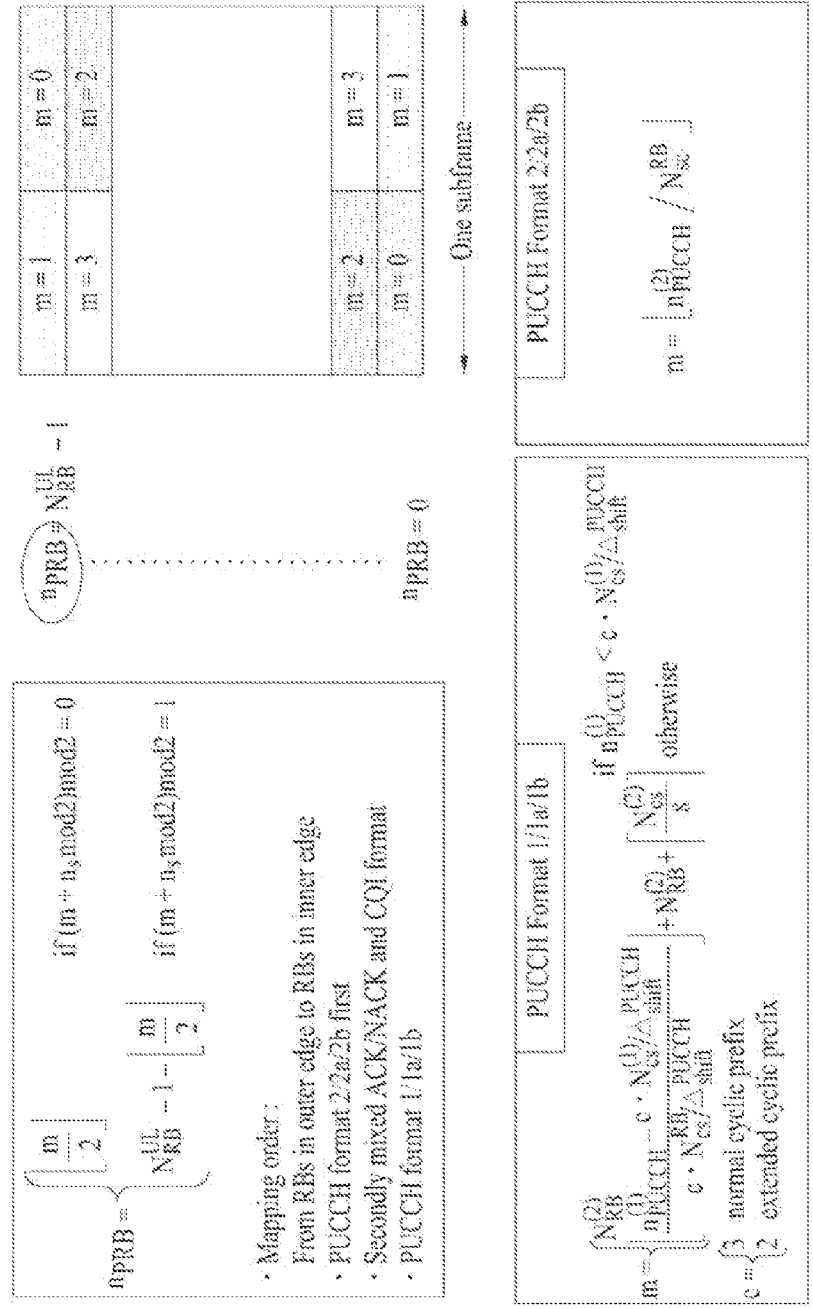
FIG. 19 is a diagram showing allocation of a PRB used to transmit a PUCCH.

FIG. 19 shows PRB allocation. As shown in FIG. 19, the PRB may be used for PUCCH transmission in a slot $n_s$.

A multi-carrier system or a carrier aggregation system refers to a system for aggregating and utilizing a plurality of carriers having a bandwidth smaller than a target bandwidth, for wideband support. When a plurality of carriers having a bandwidth smaller than a target bandwidth is aggregated, the bandwidth of the aggregated carriers may be limited to a bandwidth used in the existing system, for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support CA. Multi-carrier may be used interchangeably with CA and bandwidth aggregation. CA includes contiguous CA and non-contiguous CA.

Figure 20:
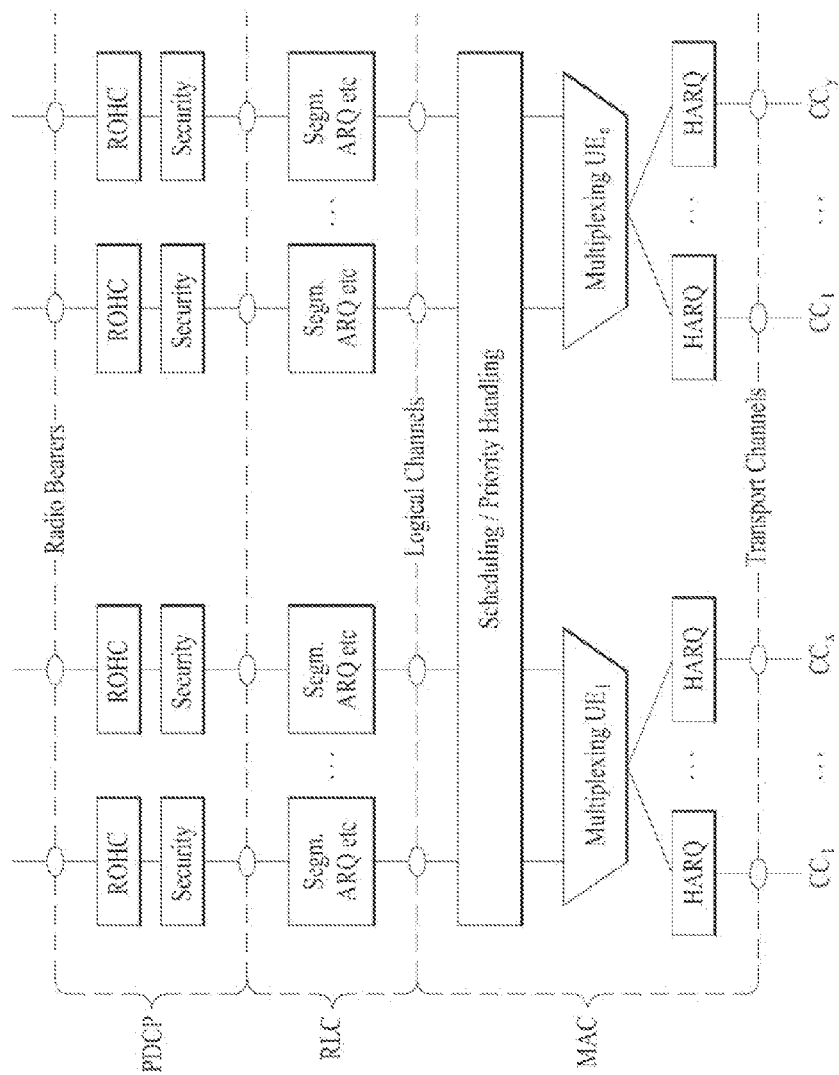
FIG. 20 is a conceptual diagram of management of a downlink component carrier in a base station (BS).
Figure 21:
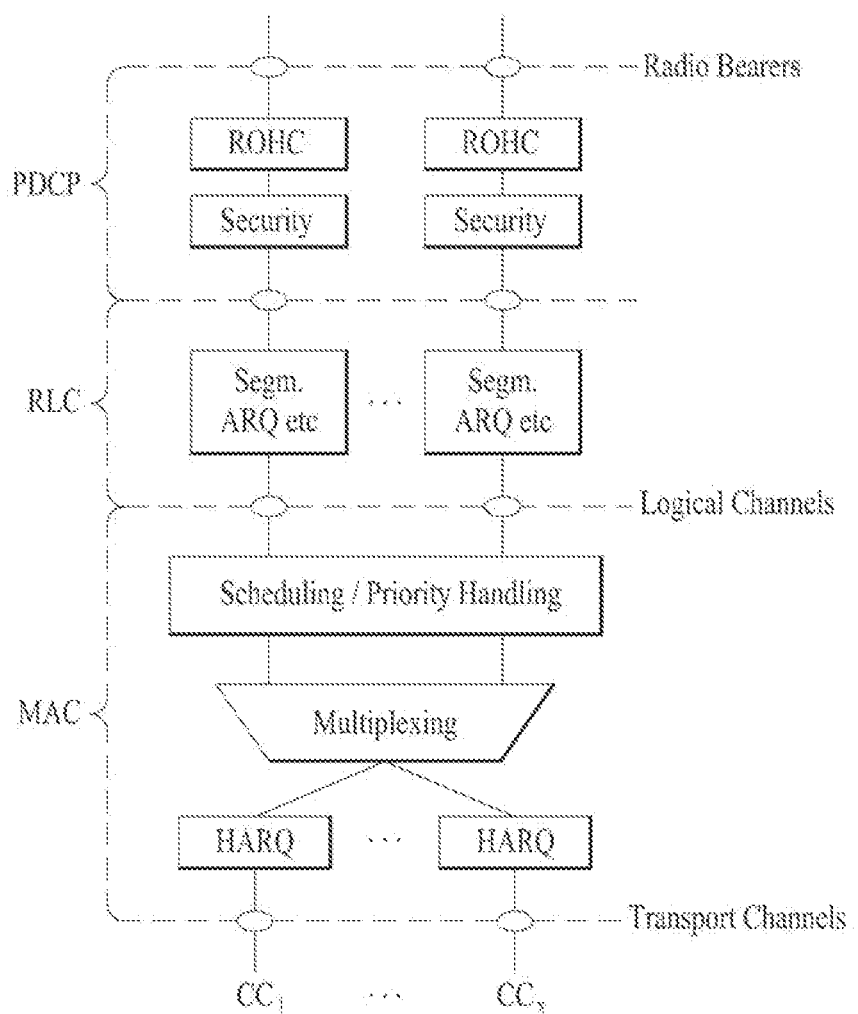
FIG. 21 is a conceptual diagram of management of an uplink component carrier in a user equipment (UE).

FIG. 20 is a conceptual diagram of management of a downlink component carrier in a BS, and FIG. 21 is a conceptual diagram of management of an uplink component carrier in a UE. For convenience of description, it is assumed that a higher layer is a MAC layer in FIGS. 20 and 21.

Figure 22:
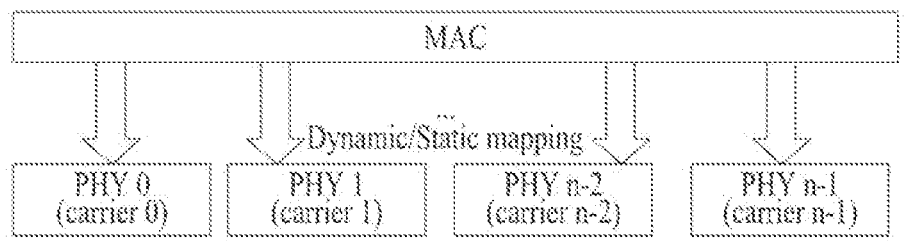
FIG. 22 is a conceptual diagram of the case where one MAC layer manages multiple carriers in a BS.
Figure 23:
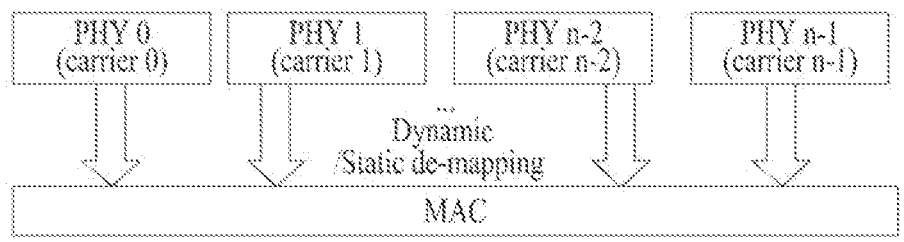
FIG. 23 is a conceptual diagram of the case where one MAC layer manages multiple carriers in a UE.

FIG. 22 is a conceptual diagram of the case where one MAC layer manages multiple carriers in a BS. FIG. 23 is a conceptual diagram of the case where one MAC layer manages multiple carriers in a UE.

Referring to FIGS. 22 and 23, one MAC layer manages one or more frequency carriers so as to perform transmission and reception. Since frequency carriers managed by one MAC layer do not need to be contiguous to each other, resource management is flexible. In FIGS. 22 and 23, one physical (PHY) layer means one component carrier, for convenience. One PHY layer does not necessarily mean an independent radio frequency (RF) device. In general, one independent RF device means one PHY layer, but the present invention is not limited thereto. One RF device may include several PHY layers.

Figure 24:
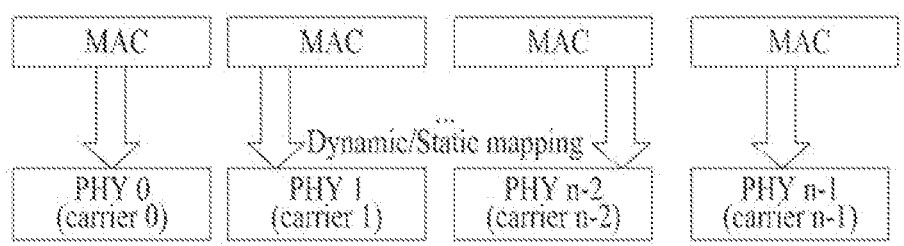
FIG. 24 is a conceptual diagram of the case where one MAC layer manages multiple carriers in a BS.
Figure 25:
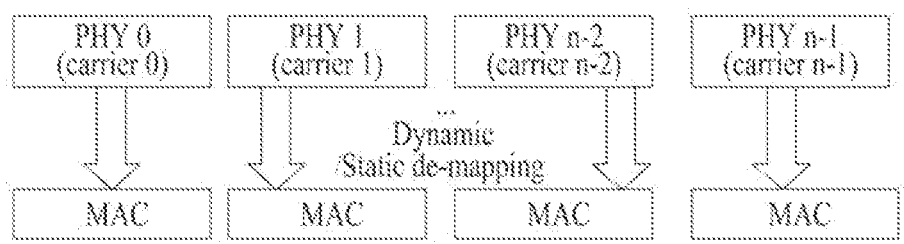
FIG. 25 is a conceptual diagram of the case where a plurality of MAC layers manages multiple carriers in a UE.

FIG. 24 is a conceptual diagram of the case where a plurality of MAC layers manages multiple carriers in a BS. FIG. 25 is a conceptual diagram of the case where a plurality of MAC layers manages multiple carriers in a UE, FIG. 26 is another conceptual diagram of the case where a plurality of MAC layers manages multiple carriers in a BS, and FIG. 27 is another conceptual diagram of the case where a plurality of MAC layers manages multiple carriers in a UE.

In addition to the structures shown in FIGS. 22 and 23, several MAC layers may control several carriers as shown in FIGS. 24 to 27.

Figure 26:
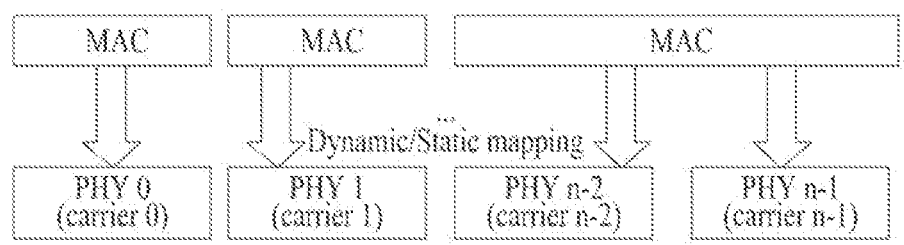
FIG. 26 is a conceptual diagram of the case where a plurality of MAC layers manages multiple carriers in a BS.
Figure 27:
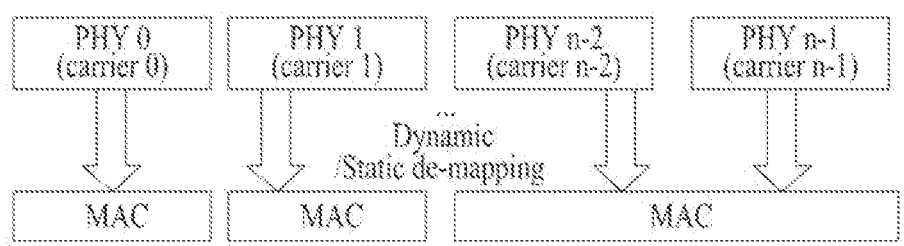
FIG. 27 is a conceptual diagram of the case where one or more MAC layers manages multiple carriers in view of reception of a UE.

Each MAC layer may control each carrier in one-to-one correspondence as shown in FIGS. 24 and 25 and each MAC layer may control each carrier in one-to-one correspondence with respect to some carriers and one MAC layer may control one or more carriers with respect to the remaining carriers as shown in FIGS. 26 and 27.

The system includes a plurality of carriers such as one carrier to N carriers and the carriers may be contiguous or non-contiguous, regardless of UL/DL. A TDD system is configured to manage a plurality (N) of carriers in DL and UL transmission. A FDD system is configured such that a plurality of carriers is used in UL and DL. In the case of the FDD system, asymmetric CA in which the number of carriers aggregated in UL and DL and/or the bandwidths of the carriers are different may be supported.

When the numbers of aggregated component carriers in UL and DL are identical, it is possible to configure all component carriers so as to enable backward compatibility with the existing system. However, component carriers which do not consider compatibility are not excluded from the present invention.

Hereinafter, for convenience of description, it is assumed that, when a PDCCH is transmitted through a DL component carrier #0, a PDSCH corresponding thereto is transmitted through a DL component carrier #0. However, cross-carrier scheduling may be applied and the PDSCH may be transmitted through another DL component carrier. The term "component carrier" may be replaced with other equivalent terms (e.g., cell).

Figure 28:
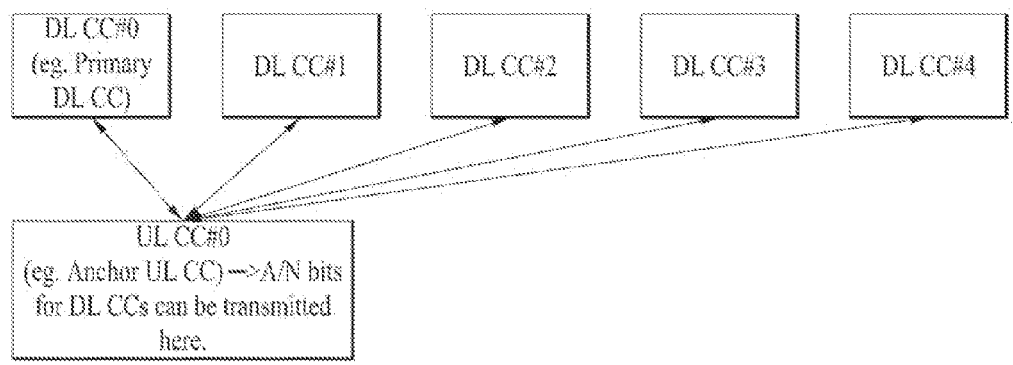
FIG. 28 is a diagram showing asymmetric carrier aggregation (CA) in which a plurality of downlink (DL) component carriers (CCs) and an uplink (UL) CC are linked.

FIG. 28 shows a scenario in which uplink control information (UCI) is transmitted in a wireless communication system supporting CA. For convenience, in the present example, it is assumed that the UCI is ACK/NACK (A/N). The UCI may include control information channel state information (e.g., CQI, PMI, RI, etc.) or scheduling request information (e.g., SR, etc.).

FIG. 28 is a diagram showing asymmetric CA in which five DL CCs and one UL CC are linked. The shown asymmetric CA is set from the viewpoint of UCI transmission. That is, a DL CC-UL CC linkage for UCI and a DL CC-UL CC linkage for data are differently set. For convenience, if it is assumed that one DL CC may transmit a maximum of two codewords, the number of UL ACK/NACK bits is at least two. In this case, in order to transmit ACK/NACK for data received through five DL CCs through one UL CC, ACK/NACK of at least 10 bits is necessary. In order to support a DTX state of each DL CC, at least 12 bits (=5⌒5=3125=11.61 bits) are necessary for ACK/NACK transmission. Since ACK/NACK of at most 2 bits may be transmitted in the existing PUCCH formats 1$a$/1$b$, such a structure cannot transmit extended ACK/NACK information. For convenience, although an example in which the amount of UCI information is increased due to CA is described, the amount of UCI information may be increased due to the increase in the number of antennas, existence of a backhaul subframe in a TDD system and a relay system, etc. Similarly to ACK/NACK, when control information associated with a plurality of DL CCs is transmitted through one UL CC, the amount of control information to be transmitted is increased. For example, in the case where a CQI for a plurality of DL CCs must be transmitted through a UL anchor (or primary) CC, CQI payload may be increased.

A DL primary CC may be defined to a DL CC linked with a UL primary CC. Linkage includes implicit and explicit linkage. In the LTE, one DL CC and one UL CC are inherently paired. For example, by LTE pairing, a DL CC linked with a UL primary CC may be referred to as a DL primary CC. This may be regarded as implicit linkage. Explicit linkage indicates that a network configures linkage in advance and may be signaled by RRC, etc. In explicit linkage, a DL CC paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. A DL primary CC may be configured through high layer signaling. A DL primary CC may be a DL CC in which a UE performs initial access. DL CCs excluding the DL primary CC may be referred to as DL secondary CCs. Similarly, UL CCs excluding a UL primary CC may be referred to as UL secondary CCs.

The LTE-A uses the concept of a cell in order to manage radio resources. The cell is defined as a combination of downlink resources and uplink resources and uplink resources are not indispensable components. Accordingly, the cell may be composed of downlink resources alone or a combination of downlink resources and uplink resources. If CA is supported, a linkage between a downlink resource carrier frequency (or DL CC) and an uplink resource carrier frequency (or UL CC) may be indicated by system information. A cell which operates on a primary frequency (or a PCC) is referred to as a primary cell (PCell) and a cell which operates on a secondary frequency (or an SCC) is referred to as a secondary cell (SCell). A DL CC and a UL CC may be referred to as a DL cell and a UL cell, respectively. In addition, an anchor (or primary) DL CC and an anchor (or primary) UL CC may be referred to as a DL PCell and a UL PCell, respectively. The PCell is used to perform an initial connection establishment process or a connection re-establishment process by a UE. The PCell may indicate a cell indicated in a handover process. The SCell may be configured after RRC connection establishment is performed and may be used to provide additional radio resources. The PCell and the SCell may be collectively called a serving cell. Accordingly, in case of a UE which is in an RRC_CONNECTED state but is not configured with CA or does not support CA, only one serving cell including only a PCell exists. In contrast, in case of a UE which is in an RRC_CONNECTED state and configured with CA, one or more serving cells exist and each serving cell includes a PCell and all SCells. For CA, a network may configure one or more SCells may be configured for a UE supporting CA after starting an initial security activation process, in addition to a PCell which is initially configured in a connection establishment process.

DL-UL pairing may be defined only in FDD. Since TDD uses the same frequency, DL-UL pairing may not be defined. DL-UL linkage may be determined from UL linkage through UL E-UTRA Absolute Radio Frequency Channel Number (EARFCN) information of SIB2. For example, DL-UL linkage may be acquired through SIB2 decoding during initial access and, otherwise, may be acquired through RRC signaling. Accordingly, only SIB2 linkage may be present, but other DL-UL pairing may not be explicitly defined. For example, in the 5DL:1UL structure of FIG. 28, DL CC#0 and UL CC#0 have an SIB2 linkage relationship and the remaining DL CCs may have a relationship with other UL CCs which are not configured for the UE.

In order to support a scenario such as FIG. 28, new scheme is necessary. Hereinafter, a PUCCH format for feedback of UCI (e.g., multiple A/N bits) in a communication system supporting a carrier aggregation is referred to a CA PUCCH format (or PUCCH format 3). For example, PUCCH format 3 is used to transmit A/N information (possibly, including DTX state) corresponding PDSCH (or PDCCH) received on multiple DL serving cells.

FIGS. 29A to 29F show the structure of PUCCH format 3 and a signal processing procedure therefore according to the present embodiment.

FIG. 29A shows the case where the PUCCH format according to the present embodiment is applied to the structure of the PUCCH format 1 (normal CP). Referring to FIG. 29A, a channel coding block channel-codes information bits $a\_0, a\_1, \ldots,$ and $a\_M-1$ (e.g., multiple ACK/NACK bits) and generates encoded bits (coded bits or coding bits) (or codewords) $b\_0, b\_1, \ldots,$ and $b\_N-1$. M denotes the size of the information bits and N denotes the size of the encoded bits. The information bits include UCI, for example, multiple ACK/NACK bits for a plurality of data (or PDSCHs) received through a plurality of DL CCs. The information bits $a\_0, a\_1, \ldots,$ and $a\_M-1$ are joint-coded regardless of the kind/number/size of UCI configuring the information bits. For example, if the information bits include multiple ACK/NACK bits for a plurality of DL CCs, channel coding is performed not with respect to each DL CC or each ACK/NACK bit, but with respect to entire bit information. Thus, a single codeword is generated. Channel coding includes but not limited to simplex repetition, simplex coding, Reed Muller (RM) coding, punctured RM coding, tail-biting convolutional coding (TBCC), low-density parity-check (LDPC) and turbo-coding. Although not shown, the encoded bits can be rate-matched in consideration of a modulation order and the amount of resources. The rate-matching function may be included in the channel coding block or may be performed using a separate functional block. For example, the channel coding block may perform (32, 0) RM coding with respect to a plurality of control information so as to obtain a single codeword and perform circular buffer rate-matching.

A modulator modulates the encoded bits $b\_0, b\_1, \ldots,$ and $b\_N-1$ and generates modulation symbols $c\_0, c\_1, \ldots,$ and $c\_L-1$. L denotes the size of the modulation symbols. The modulation method is performed by changing the amplitude and phase of the transmitted signal. The modulation method includes, for example, n-phase shift keying (PSK) and n-quadrature amplitude modulation (QAM) (n is an integer greater than or equal to 2). More specifically, the modulation method may include binary PSK (BPSK), quadrature PSK (QPSK), 8-PSK, QAM, 16-QAM, 64-QAM, etc.

A divider divides the modulation symbols $c\_0, c\_1, \ldots,$ and $c\_L-1$ into slots. The order/pattern/method of dividing the modulation symbols to slots is not specially limited. For example, the divider may divide the modulation symbols to slots sequentially from the head (local type). In this case, as shown, the modulation symbols $c\_0, c\_1, \ldots,$ and $c\_L/2-1$ may be divided to a slot 0 and the modulation symbols $c\_L/2, c\_L/2+1, \ldots,$ and $c\_L-1$ may be divided to a slot 1. The modulation symbols may be interleaved (or permutated) when being divided to the slots. For example, even-numbered modulation symbols may be divided to the slot 0 and odd-numbered modulation symbols may be divided to the slot 1. The order of the modulation process and the division process may be changed. Instead of dividing different coding bits into slots, the same coding bits may be configured to be repeated in slot units. In this case, the divider may be omitted.

A DFT precoder performs DFT precoding (e.g., 12-point DFT) with respect to the modulation symbols divided to the slots, in order to generate a single carrier waveform. Referring to the drawing, the modulation symbols $c\_0, c\_1, \ldots,$ and $c\_L/2-1$ divided to the slot 0 are DFT-precoded to DFT symbols $d\_0, d\_1, \ldots,$ and $d\_L/2-1$, and the modulation symbols $c\_L/2, c\_L/2+1, \ldots,$ and $c\_L-1$ divided to the slot 1 are DFT-precoded to DFT symbols $d\_L/2, d\_L/2+1, \ldots,$ and $d\_L-1$. DFT precoding may be replaced with another linear operation (e.g., Walsh precoding). The DFT precoder may be replaced with a CAZAC modulator. The CAZAC modulator modulates the modulation symbols $c\_0, c\_1, \ldots,$ and $c\_L/2-1$ and $c\_L/2, c\_L/2+1, \ldots,$ and $c\_L/-1$ divided to the slots with corresponding sequences and generate CAZAC modulation symbols $d\_0, d\_1, \ldots, d\_l/2-1$ and $d\_L/2, d\_L/2+1, \ldots,$ and $d\_L-1$. The CAZAC modulator includes, for example, CAZAC sequences or sequences for LTE computer generated (CG) 1RB. For example, if the LTE CG sequences are $r\_0, \ldots,$ and $r\_L/2-1$, the CAZAC modulation symbols may be $d\_n=c\_n*r\_n$ or $d\_n=conj(c\_n)*r\_n$.

A spreading block spreads a signal subjected to DFT at an SC-FDMA symbol level (time domain). Time domain spreading of the SC-FDMA symbol level is performed using a spreading code (sequence). The spreading code includes a quasi-orthogonal code and an orthogonal code. The quasi-orthogonal code includes, but is not limited to, a pseudo noise (PN) code. The orthogonal code includes, but is not limited to, a Walsh code and a DFT code. Although the orthogonal code is described as a representative example of the spreading code for ease of description in the present specification, the orthogonal code is only exemplary and may be replaced with a quasi-orthogonal code. A maximum value of a spreading code size (or a spreading factor (SF)) is restricted by the number of SC-FDMA symbols used to transmit control information. For example, in the case where four SC-FDMA symbols are used to transmit control information in one slot, (quasi-)orthogonal codes w0, w1, w2 and w3 having a length of 4 may be used in each slot. The SF means the spreading degree of the control information and may be associated with the multiplexing order of a UE or the multiplexing order of an antenna. The SF may be changed to 1, 2, 3, 4, . . . according to requirements of the system and may be defined between a BS and a UE in advance or may be informed to the UE through DCI or RRC signaling. For example, in the case where one of SC-FDMA symbols for control information is punctured in order to transmit an SRS, a spreading code with a reduced SF (e.g., SF=3 instead of SF=4) may be applied to the control information of the slot.

The signal generated through the above procedure is mapped to subcarriers in a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, each procedure will be described in detail. In the case where each DL CC may transmit two PDSCHs, the number ACK/NACK bits may be 12 if a DTX state is included. In consideration of QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 DFT symbols by a 12-point DFT operation. In each slot, 12 DFT symbols are spread to four SC-FDMA symbols using the spreading code having SF=4 in a time domain and are mapped. Since 12 bits are transmitted through [2 bits*12 subcarriers+8 SC-FDMA symbols], the coding rate is 0.0625 (=12192). In case of SF=4, a maximum of four UEs may be multiplexed per 1PRB.

Figure 29B:
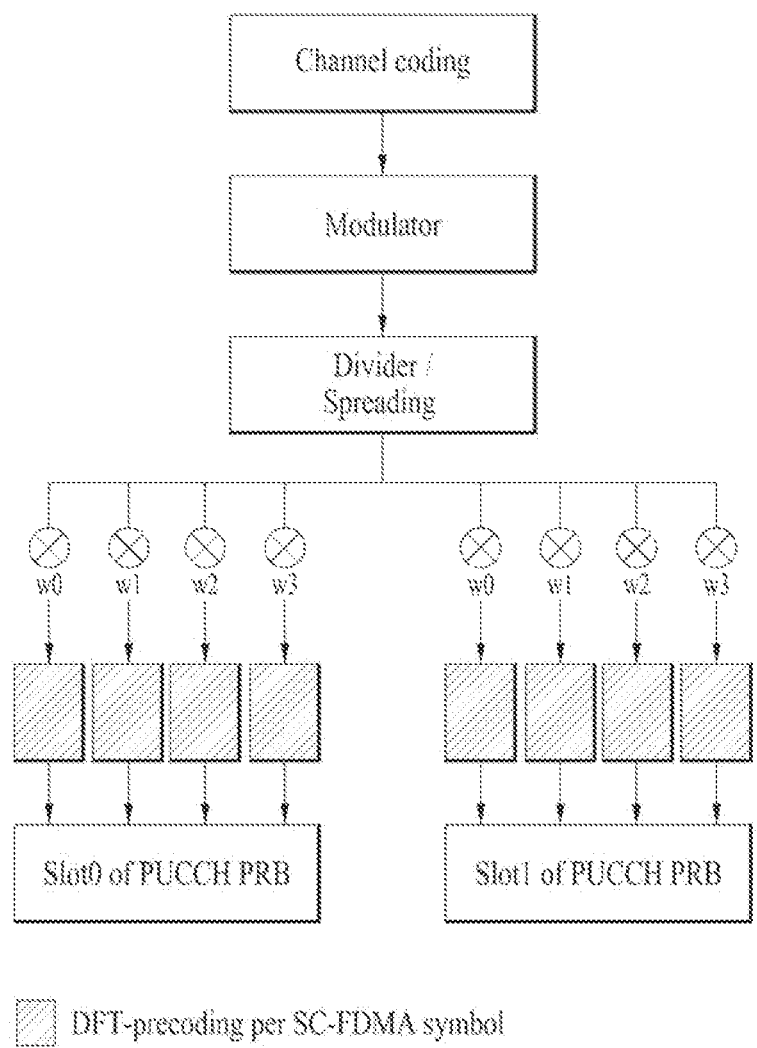

The signal processing procedure described with reference to FIG. 29A is only exemplary and the signal mapped to the PRB in FIG. 29A may be obtained using various equivalent signal processing procedures. The signal processing procedures equivalent to FIG. 29A will be described with reference to FIGS. 29B to 29F.

FIG. 29B is different from FIG. 29A in the order of the DFT precoder and the spreading block. In FIG. 29A, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed in order of channel coding, modulation, division, spreading and DFT precoding. In this case, the division process and the spreading process may be performed by one functional block. For example, the modulation symbols may be spread at the SC-FDMA symbol level while being alternately divided to slots. As another example, the modulation symbols are copied to suit the size of the spreading code when the modulation symbols are divided to slots, and the modulation symbols and the elements of the spreading code may be multiplied in one-to-one correspondence. Accordingly, the modulation symbol sequence generated in each slot is spread to a plurality of SC-FDMA symbols at the SC-FDMA symbol level. Thereafter, the complex symbol sequence corresponding to each SC-FDMA symbol is DFT-precoded in SC-FDMA symbol units.

Figure 29C:
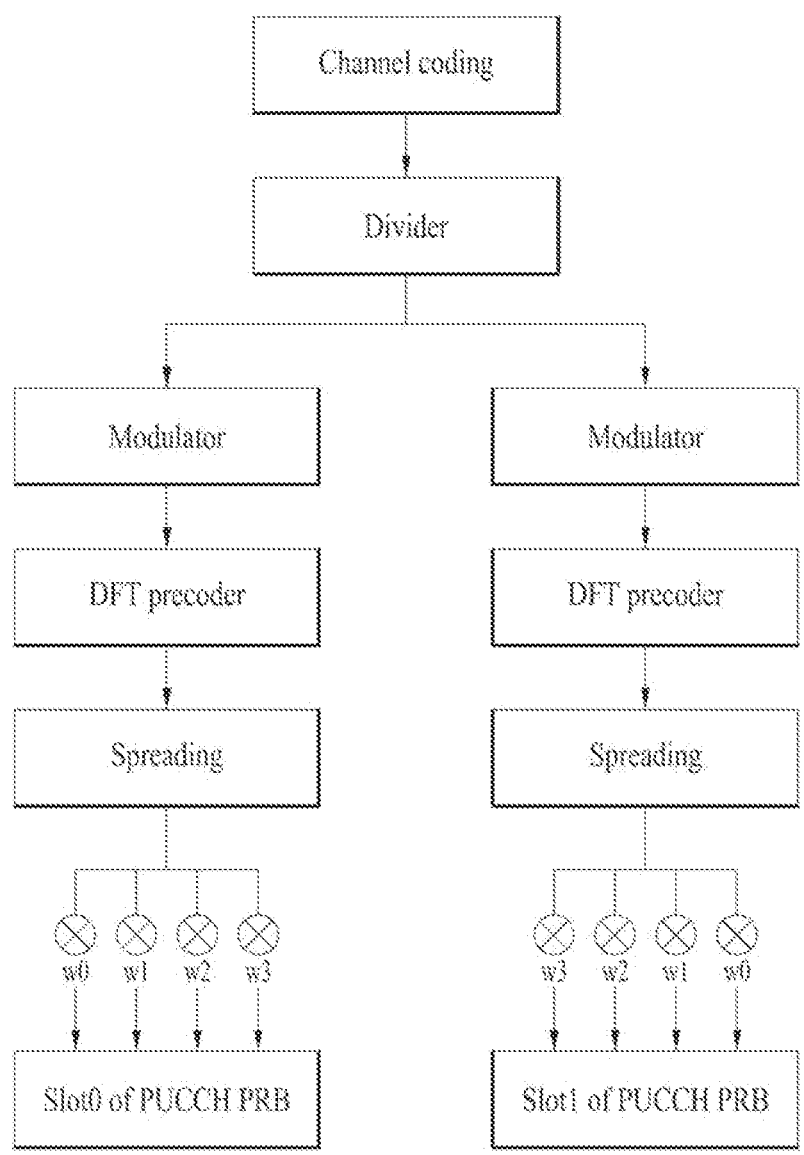

FIG. 29C is different from FIG. 29A in the order of the modulator and the divider. Accordingly, the signal processing procedure for the PUCCH format 3 may be performed in order of joint channel coding and division at a subframe level and modulation, DFT precoding and spreading at each slot level.

Figure 29D:
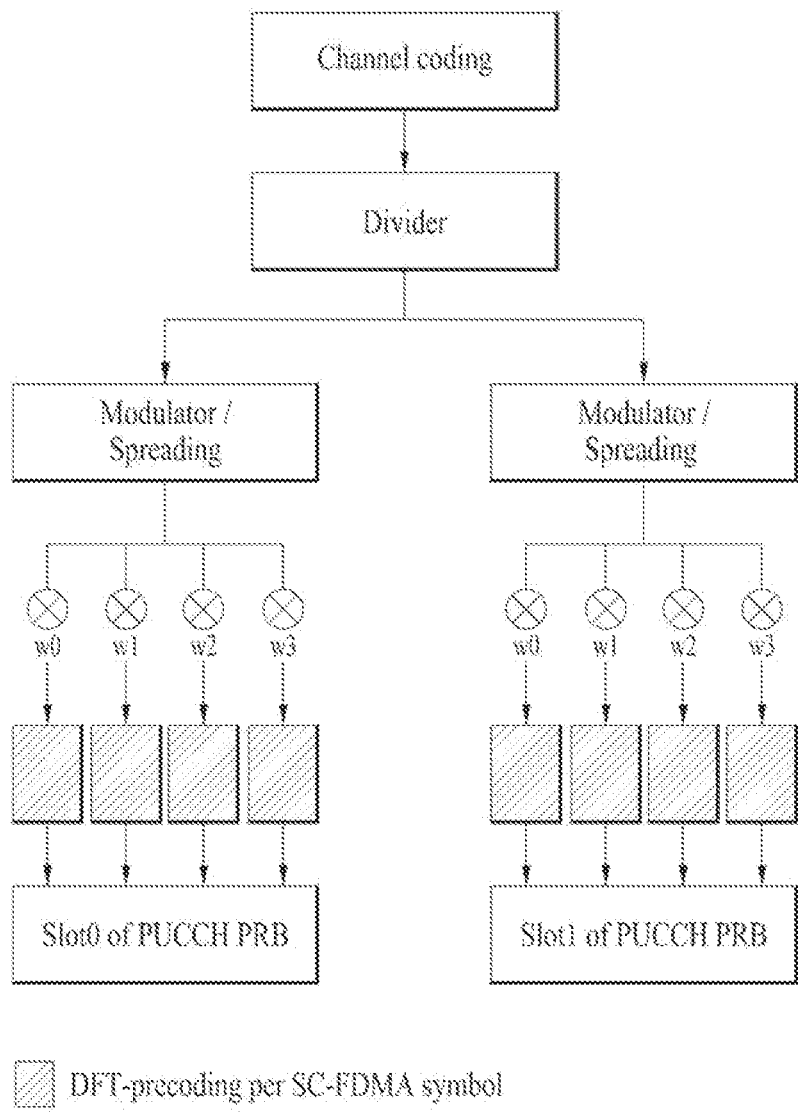

FIG. 29D is different from FIG. 29C in order of the DFT precoder and the spreading block. As described above, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed by joint channel coding and division at a subframe level and modulation at each slot level. The modulation symbol sequence generated in each slot is spread to a plurality of SC-FDMA symbols at the SC-FDMA symbol level and the modulation symbol sequence corresponding to each SC-FDMA symbol is DFT-precoded in SC-FDMA symbol units. In this case, the modulation process and the spreading process may be performed by one functional block. For example, the generated modulation symbols may be directly spread at the SC-FDMA symbol level while the encoded bits are modulated. As another example, the modulation symbols are copied to suit the size of the spreading code when the encoded bits are modulated, and the modulation symbols and the elements of the spreading code may be multiplied in one-to-one correspondence.

Figure 29E:
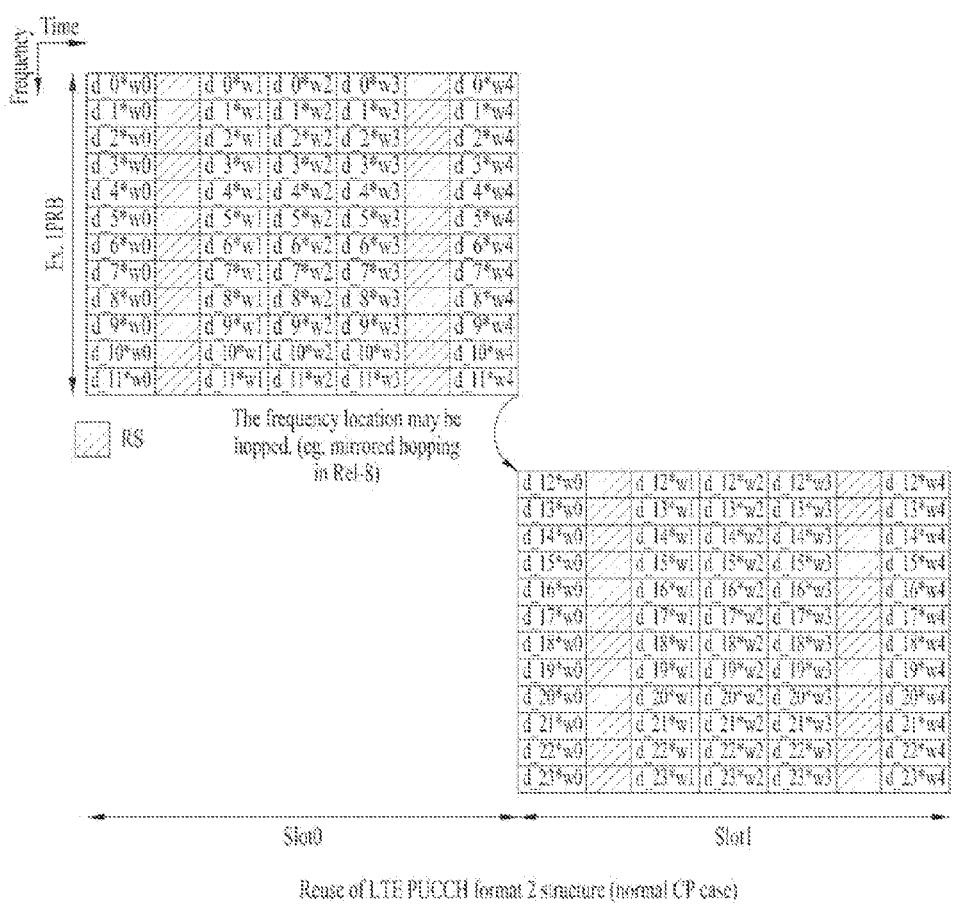
Figure 29F:
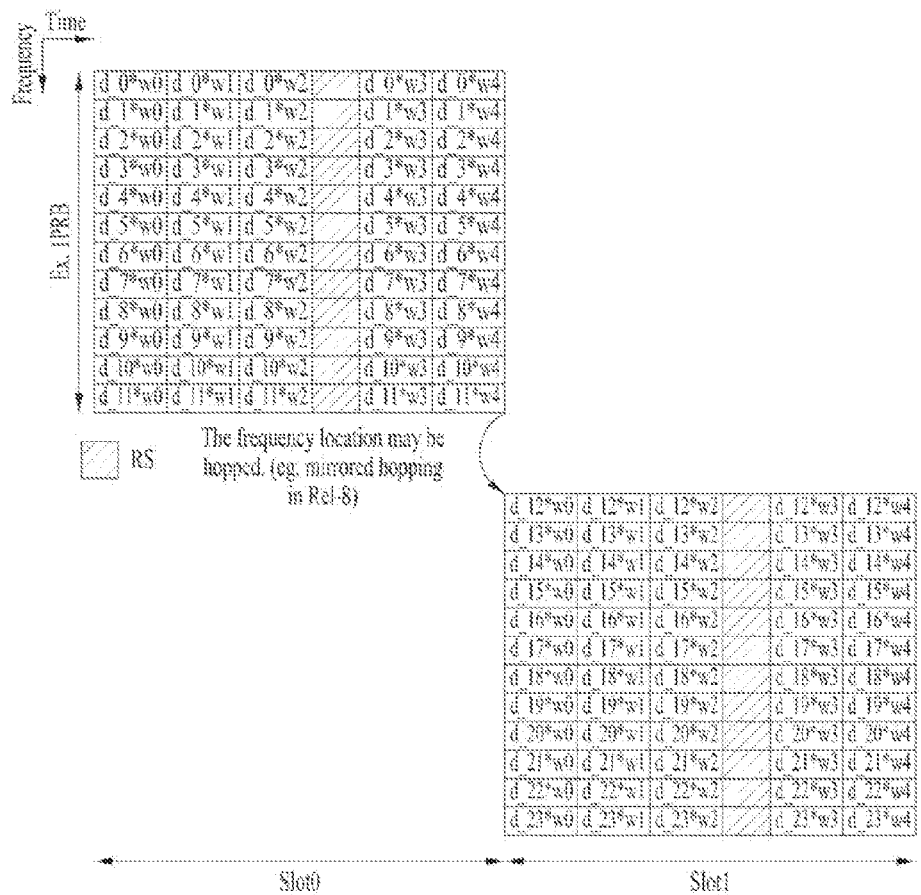

FIG. 29E shows the case where the PUCCH format 3 according to the present embodiment is applied to the structure of the PUCCH format 2 (normal CP) and FIG. 29F shows the case where the PUCCH format 3 according to the present embodiment is applied to the structure of the PUCCH format 2 (extended CP). The basic signal processing procedure is equal to those described with respect to FIGS. 29A to 29D. As the structure of the PUCCH format 2 of the existing LTE is reused, the number/locations of UCI SC-FDMA symbols and RS SC-FDMA symbols in the PUCCH format 3 is different from that of FIG. 29A.

Table 14 shows the location of the RS SC-FDMA symbol in the PUCCH format 3. It is assumed that the number of SC-FDMA symbols in a slot is 7 (indexes 0 to 6) in the normal CP case and the number of SC-FDMA symbols in a slot is 6 (indexes 0 to 5) in the extended CP case.

TABLE 14

|  | SC-FDMA symbol location of RS | | |
|---|---|---|---|
|  | Normal CP | Extended CP | Note |
| PUCCH format 3 | 2, 3, 4 | 2, 3 | PUCCH format 1 is reused |
|  | 1, 5 | 3 | PUCCH format 2 is reused |

Here, the RS may reuse the structure of the existing LTE. For example, an RS sequence may be defined using cyclic shift of a base sequence (see Equation 1).

A signal processing procedure of a PUCCH format 3 will be described using equations. For convenience, it is assumed that a length-5 OCC is used (e.g., FIGS. 29E to 29F).

First, a bit block $b(0), \ldots, b(M_{bit}-1)$ is scrambled using a UE-specific scrambling sequence. The bit block $b(0), \ldots, b(M_{bit}-1)$ may correspond to coded bits $b\_0, b\_1, b\_N-1$ of FIG. 29A. The bit block $b(0), \ldots, b(M_{bit}-1)$ may include at least one of an ACK/NACK bit, a CSI bit and an SR bit. The scrambled bit block $\tilde{b}(0), \ldots, \tilde{b}(M_{bit}-1)$ may be generated by the following equation.

$$\tilde{b}(i) = (b(i) + c(i)) \bmod 2 \qquad \text{Equation 10}$$

where, $c(i)$ denotes a scrambling sequence. $c(i)$ includes a pseudo-random sequence defined by a length-31 gold sequence and may be generated by the following equation. mod denotes a modulo operation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{Equation 11}$$

where, $N_C=1600$. A first m-sequence is initialized to $x_1(0)=1, x_1(n)=0, n=1,2,\ldots,30$. A second m-sequence is initialized to $c_{init} = \Sigma_{i=0}^{30} x_2(i) \cdot 2^i$. $c_{init}$ may be initialized to $c_{init} = (\lfloor n_s/2 \rfloor + 1) \cdot (2N_{ID}^{cell} + 1) \cdot 2^{16} + n_{RNTI}$ whenever a subframe is started. $n_s$ denotes a slot number in a radio frame, $N_{ID}^{cell}$ denotes a physical layer cell identity, and $n_{RNTI}$ denotes a radio network temporary identifier.

The scrambled bit block $\tilde{b}(0), \ldots, \tilde{b}(M_{bit}-1)$ is modulated and a complex modulation symbol block $d(0), \ldots, d(M_{symb}-1)$ is generated. When QPSK modulation is performed, $M_{symb} = M_{bit}/2 = 2N_{sc}^{RB}$. The complex modulation symbol block $d(0), \ldots, d(M_{symb}-1)$ correspond to modulation symbols $c\_0, c\_1, c\_N-1$ of FIG. 29A.

The complex modulation symbol block $d(0), \ldots, d(M_{symb}-1)$ are block-wise spread using an orthogonal sequence $w_{n_{oc}}(i)$. $N_{SF,0}^{PUCCH} + N_{SF,1}^{PUCCH}$ complex symbol sets are generated by the following equation. A frequency division/ spreading process of FIG. 29B is performed by the following equation. Each complex symbol set corresponds to one SC-FDMA symbol and has $N_{sc}^{RB}$ (e.g., 12) complex modulation values.

$$y_n^{(\tilde{p})}(i) = \begin{cases} w_{n_{oc,0}}^{(\tilde{p})}(\bar{n}) \cdot e^{j\pi\lfloor n_{cs}^{cell}(n_s,l)/64\rfloor/2} \cdot d(i) & n < N_{SF,0}^{PUCCH} \\ w_{n_{oc,1}}^{(\tilde{p})}(\bar{n}) \cdot e^{j\pi\lfloor n_{cs}^{cell}(n_s,l)/64\rfloor/2} \cdot d(N_{sc}^{RB}+i) & \text{otherwise} \end{cases}$$

$$\bar{n} = n\,\text{mod}\,N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Equation 12 where, $N_{SF,0}^{PUCCH}$ and $N_{SF,1}^{PUCCH}$ correspond to the number of SC-FDMA symbols used for PUCCH transmission at a slot 0 and a slot 1, respectively. In case of using a normal PUCCH format 3, $N_{SF,0}^{PUCCH}=N_{SF,1}^{PUCCH}=5$. In case of using a shortened PUCCH format 3 $N_{SF,0}^{PUCCH}=5$ and $N_{SF,1}^{PUCCH}=4$. $w_{n_{oc,0}}^{(\tilde{p})}(i)$ and $w_{n_{oc,1}}^{(\tilde{p})}(i)$ respectively indicate orthogonal sequences applied to a slot 0 and a slot 1 and are given by Table 15. $n_{oc}^{(\tilde{p})}$ denotes an orthogonal sequence index (or an orthogonal code index). $\lfloor \, \rfloor$ denotes a flooring function. $n_{cs}^{cell}(n_s,l)$ may be $n_{cs}^{cell}(n_s,l)=\Sigma_{i=0}^{7}c$ $(8N_{symb}^{UL}\cdot n_s+8l+i)\cdot 2^i$. $c(i)$ may be given by Equation 11 and may be initialized to $c_{init}=n_{ID}^{cell}$ at the beginning of every radio frame. $n=0, \ldots, N_{SF,0}^{PUCCH}+N_{SF,1}^{PUCCH}-1$. $\tilde{p}$ denotes an index corresponding to an antenna port number.

Table 15 shows an orthogonal $w_{n_{oc}}(i)$ according to the conventional method.

TABLE 15

| Sequence index $n_{oc}$ | Orthogonal sequence $[w_{n_{oc}}(0) \ldots w_{n_{oc}}(N_{SF}^{PUCCH}-1)]$ | |
|---|---|---|
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

In Table 15, $N_{SF}^{PUCCH}=5$ orthogonal sequence (or code) is generated by the following equation.

$$\left[ e^{j\frac{2\pi\cdot 0\cdot n_{oc}}{5}} \; e^{j\frac{2\pi\cdot 1\cdot n_{oc}}{5}} \; e^{j\frac{2\pi\cdot 2\cdot n_{oc}}{5}} \; e^{j\frac{2\pi\cdot 3\cdot n_{oc}}{5}} \; e^{j\frac{2\pi\cdot 4\cdot n_{oc}}{5}} \right]$$

Equation 13

Resources for the PUCCH format 3 are identified by a resource index $n_{PUCCH}^{(3,\tilde{p})}$. For example, $n_{oc}^{(\tilde{p})}$ may be $n_{oc}^{(\tilde{p})}=n_{PUCCH}^{(3,\tilde{p})}\,\text{mod}\,N_{SF,1}^{PUCCH}$. $n_{PUCCH}^{(3,\tilde{p})}$ may be indicated through a transmit power control (TPC) field of an SCell PDCCH. More specifically, $n_{oc}^{(\tilde{p})}$ for each slot may be given by the following equation.

$$n_{oc,0}^{(\tilde{p})} = n_{PUCCH}^{(3,\tilde{p})}\,\text{mod}\,N_{SF,1}^{PUCCH}$$

Equation 14

$$n_{oc,1}^{(\tilde{p})} = \begin{cases} (3n_{oc,0}^{(\tilde{p})})\,\text{mod}\,N_{SF,1}^{PUCCH} & \text{if } N_{SF,1}^{PUCCH} = 5 \\ n_{oc,0}^{(\tilde{p})}\,\text{mod}\,N_{SF,1}^{PUCCH} & \text{otherwise} \end{cases}$$

where, $n_{oc,0}^{(\tilde{p})}$ denotes a sequence index value $n_{oc}^{(\tilde{p})}$ for a slot 0 and $n_{oc,1}^{(\tilde{p})}$ denotes a sequence index value $n_{oc}^{(\tilde{p})}$ for a slot 1. In case of a normal PUCCH format 3, $N_{SF,0}^{PUCCH}=N_{SF,1}^{PUCCH}=5$. In case of a shortened PUCCH format 3, $N_{SF,0}^{PUCCH}=5$, $N_{SF,1}^{PUCCH}=4$.

According to the above equation, in case of the shortened PUCCH format 3 (that is, $N_{SF,1}^{PUCCH}=4$), an orthogonal sequence of the same index $n_{oc,1}^{(\tilde{p})}$ is used in the slot 0 and the slot 1.

A block-spread complex symbol set may be cyclic-shifted according to the following equation.

$$\tilde{y}_n^{(\tilde{p})}(i)=y_n^{(\tilde{p})}((i+n_{cs}^{cell}(n_s,l))\,\text{mod}\,N_{sc}^{RB})$$

Equation 15 where, $n_s$ denotes a slot number within a radio frame and l denotes an SC-FDMA symbol number within a slot. $n_{cs}^{cell}(n_s,l)$ is defined by Equation 12. $n=0, \ldots, N_{SF,0}^{PUCCH}+N_{SF,1}^{PUCCH}-1$.

Each cyclic-shifted complex symbol set is transform-precoded according to the following equation. As a result, a complex symbol block $z^{(\tilde{p})}(0), \ldots, z^{(\tilde{p})}((N_{SF,0}^{PUCCH}+N_{SF,1}^{PUCCH})N_{sc}^{RB}-1)$ is generated.

$$z^{(\tilde{p})}(n\cdot N_{sc}^{RB}+k) = \frac{1}{\sqrt{P}}\frac{1}{\sqrt{N_{sc}^{RB}}}\sum_{i=0}^{N_{sc}^{RB}-1}\tilde{y}_n^{(\tilde{p})}(i)e^{-j\frac{2\pi ik}{N_{sc}^{RB}}}$$

$$k = 0, \ldots, N_{sc}^{RB} - 1$$

$$n = 0, \ldots, N_{SF,0}^{PUCCH} + N_{SF,1}^{PUCCH} - 1$$

Equation 16

The complex symbol block $z^{(\tilde{p})}(0), \ldots, z^{(\tilde{p})}((N_{SF,0}^{PUCCH}+N_{SF,1}^{PUCCH})N_{sc}^{RB}-1)$ is mapped to physical resources after power control. Power control will be described in detail below. A PUCCH uses one resource block in each slot of a subframe. In the resource block, $z^{(\tilde{p})}(0), \ldots, z^{(\tilde{p})}((N_{SF,0}^{PUCCH}+N_{SF,1}^{PUCCH})N_{sc}^{RB}-1)$ is mapped to a resource element (k,l) on an antenna port p, which is not used for RS transmission (see Table 14). Mapping is performed in ascending order of k, l then slot number, starting from the first slot of a subframe. k denotes a subcarrier index and l denotes an SC-FDMA symbol index in a slot. P denotes the number of antenna ports used for PUCCH transmission. p denotes an antenna port number used for PUCCH transmission and a relationship between p and $\tilde{p}$ is shown in the following table.

TABLE 16

| | Antenna port number p (function of the number P of antenna ports configured for PUCCH) | | |
|---|---|---|---|
| Index $\tilde{p}$ | 1 | 2 | 4 |
| 0 | 100 | 200 | — |
| 1 | — | 201 | — |

Hereinafter, a conventional PUCCH power control method will be described. The PUCCH format 3 will be focused upon. If a serving cell c is a primary cell, UE transmit power $P_{PUCCH}$ (i) for PUCCH transmission at a subframe i is given as follows.

$$P_{PUCCH}(i) = \min \begin{cases} P_{CMAX,c}(i), \\ P_{0\_PUCCH} + PL_c + h(\cdot) + \Delta_{F\_PUCCH}(F) + \Delta_{TxD}(F') + g(i) \end{cases} \quad \text{Equation 17}$$

$P_{CMAX,c}(i)$ denotes maximum transmit power of a UE configured for the serving cell c.

$P_{O\_PUCCH}$ is a parameter composed of a sum of $P_{O\_NOMINAL\_PUCCH}$ and $P_{O\_UE\_PUCCH}$. $P_{O\_NOMINAL\_PUCCH}$ and $P_{O\_UE\_PUCCH}$ are provided by a higher layer (e.g., an RRC layer). $PL_c$ denotes a downlink path loss estimation value of the serving cell c.

A parameter $\Delta_{F\_PUCCH}$ (F) is provided by a higher layer. Each $\Delta_{F\_PUCCH}$(F) value denotes a value corresponding to a PUCCH format relative to a PUCCH format 1a.

In the case where a UE is configured to transmit a PUCCH using two antenna ports by a higher layer, a parameter $\Delta_{TxD}$ (F') is provided by a higher layer. Otherwise, that is, in the case where a UE is configured to transmit a PUCCH using a single antenna port, $\Delta_{TxD}$(F') is 0. That is, $\Delta_{TxD}$(F') corresponds to a power compensation value considering an antenna port transmission mode.

h(•) is dependent on a PUCCH format. h(•) is a function having at least one of $n_{CQI}$, $n_{HARQ}$ and $n_{SR}$ as a parameter.

In case of the PUCCH format 3, $$h(\cdot) = \frac{n_{HARQ} + n_{SR} - 1}{2}$$

is given.

where, $n_{CQI}$ denotes a power compensation value associated with channel quality information. More specifically, $n_{CQI}$ corresponds to the number of information bits for channel quality information. $n_{SR}$ denotes a power compensation value associated with SR. More specifically, $n_{SR}$ corresponds to the number of SR bits. If a time when HARQ-ACK will be transmitted through the PUCCH format 3 is a subframe (referred to as an SR subframe) configured for SR transmission, a UE transmits an SR bit (e.g., 1 bit) and one or more HARQ-ACK bits, which are joint-coded, through the PUCCH format 3. Accordingly, the size of the control information transmitted through the PUCCH format 3 on an SR subframe is always greater than a HARQ-ACK payload size by 1. Accordingly, $n_{SR}$ is 1 if a subframe i is an SR subframe and is 0 if a subframe i is a non-SR subframe.

$n_{HARQ}$ denotes a power compensation value associated with HARQ-ACK. More specifically, $n_{HARQ}$ is associated with the number of (valid or actual) information bits. In addition, $n_{HARQ}$ is defined as the number of transport blocks received on a downlink subframe. That is, power control is determined by the number of PDCCHs for packets scheduled by an eNB and successfully decoded by an UE. In contrast, a HARQ-ACK payload size is determined by the number of configured DL cells. Accordingly, if a UE has one serving cell, $n_{HARQ}$ is the number of HARQ bits transmitted on a subframe i. If a UE has a plurality of serving cells, $n_{HARQ}$ may be given as follows. In case of TDD, if a UE receives an SPS release PDCCH on one of subframes $i-k_m$ ($k_m \in K$, $0 \le m \le M-1$) from a serving cell c, $n_{HARQ,c}$=(the number of transport blocks received on the subframes $i-k_m$)+1. If a UE does not receive an SPS release PDCCH on one of subframes $i-k_m$ ($k_m \in K:\{k_0, k_1, \ldots k_{M-1}\}$, $0 \le m \le M-1$) from a serving cell c, $n_{HARQ,c}$=(the number of transport blocks received on the sub-frames $i-k_m$). In case of FDD, $n_{HARQ}$ is given similarly to the case of TDD and M=1 and $k_0$=4.

More specifically, in case of TDD, $$n_{HARQ} = \sum_{c=0}^{C-1} \sum_{k_m \in K} N_{k_m,c}^{received}$$

may be given. C denotes the number of configured serving cells. $N_{k_m,c}^{received}$ denotes the number of transport blocks and SPS release PDCCHs received on the subframes $i-k_m$ of the serving cell c. In case of FDD, $$n_{HARQ} = \sum_{c=0}^{C-1} N_c^{received}$$

may be given. $N_c^{received}$ denotes the number of transport blocks and SPS release PDCCHs received on subframes $i-4$ of the serving cell c.

g(i) denotes a current PUCCH power control adjustment state. More specifically, $$g(i) = g(i-1) + \sum_{m=0}^{M-1} \delta_{PUCCH}(i - k_m)$$

may be given. g(0) is a first value after reset. $\delta_{PUCCH}$ is a UE-specific correction value and is also called a TPC command. $\delta_{PUCCH}$ is included in a PDCCH having a DCI format 1A/1B/1D/1/2A/2/2B/2C in case of PCell. In addition, $\delta_{PUCCH}$ is joint-coded with another UE-specific PUCCH correction value on a PDCCH having a DCI format 3/3A.

Figure 30:
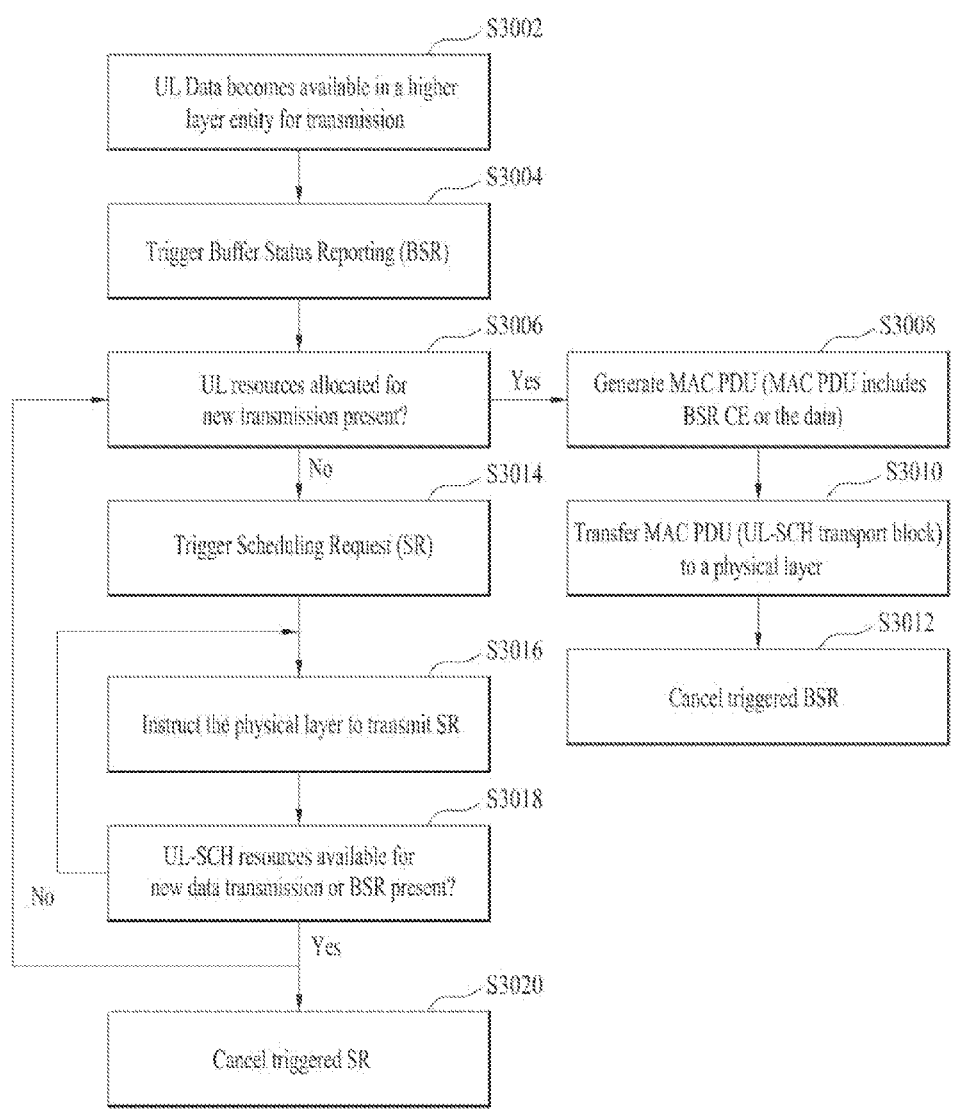
FIG. 30 is a flowchart illustrating a UL transmission process according to the existing 3GPP Rel-8/9.

Embodiment: PUCCH Power Control in the Case where Simultaneous PUCCH and PUSCH Transmission Mode is Configured FIG. 30 shows a UL transmission process according to the existing 3GPP Rel-8/9. FIG. 30 shows a buffer status reporting (BSR) and SR process of a MAC layer.

Referring to FIG. 30, if UL data becomes available for transmission in a higher layer entity (e.g., an RLC entity or a PDCP entity) (S3002), a BSR process is triggered (S3004). The BSR process is used to provide information about the amount of available data for transmission in a UL buffer of a UE to a serving eNB. If the BSR process is triggered, the MAC layer determines whether UL resources (e.g., UL-SCH resources) allocated for new transmission are present (S3006). If the allocated UL-SCH resources are present, the MAC layer generates a MAC PDU (S3008). The MAC PDU may include pending data available for transmission and/or BSR MAC control element (CE). Thereafter, the MAC layer transmits the generated MAC PDU to a physical (PHY) layer (S3010). The MAC PDU is transmitted to the PHY layer via a UL-SCH channel. In view of the PHY layer, the MAC PDU is a UL-SCH transmission block. Thereafter, the triggered BSR process is cancelled (S3012). If pending data is present in the buffer after the BSR MAC CE is transmitted, the eNB may allocate UL-SCH resources to the UE in consideration of the BSR and the UE may transmit pending data using the allocated resources.

In contrast, if the UL resources allocated for new transmission are not present, the SR process is triggered (S3014). The SR process is used to request UL-SCH resources for new transmission. If the SR process is triggered, the MAC layer instructs the PHY layer to signal an SR (S3016). The PHY layer transmits the SR on an SR subframe (a subframe configured for SR transmission) according to the instruction of the MAC layer. Thereafter, the MAC layer determines whether UL-SCH resources available for new data transmission or BSR are present or not (S3018). If the available UL-SCH resources are not present, the SR process is pending and steps S3014 to S3016 are repeated. In contrast, if the available UL-SCH resources are present, that is, if UL-SCH resources are allocated through UL grant, the triggered SR process is cancelled (S3020). If the UL-SCH resources become available by the SR process, steps S3006 to S3012 are performed according to the BSR process.

In summary, in the existing 3GPP Rel-8/9, the SR is triggered and no PUSCH is transmitted on the SR subframe (that is, UL-SCH resources/UL-SCH transport blocks for the SR subframe are not present), the UE transmits a positive SR through a PUCCH format 1. In contrast, if the SR is triggered and a PUSCH is transmitted on the SR subframe (that is, UL-SCH resources/UL-SCH transport blocks for the SR subframe are present), the UE drops SR transmission and transmits a BSR MAC CE and/or pending data through the PUSCH.

Meanwhile, in the existing 3GPP Rel-8/9, the SR may be triggered and an aperiodic CQI only PUSCH may be triggered in the SR subframe. The CQI only PUSCH signal includes only a CQI and does not include data (that is, a UL-SCH transport block). Accordingly, if the CQI only PUSCH is triggered, since available UL-SCH resources for new transmission are not present, the triggered SR is not cancelled. That is, simultaneous transmission of the CQI only PUSCH signal and the SR PUCCH signal is required on the same subframe. However, in the existing 3GPP Rel-8/9, simultaneous transmission of the PUCCH and PUSCH is not allowed. Accordingly, in this example, the UE regards CQI only PUSCH triggering as mis-configuration. As a result, the UE drops aperiodic CQI PUSCH transmission and transmits only the positive SR through the PUCCH format 1. For reference, if the value of a CQI request field is 1, a MCS index $I_{MCS}$ is 29 and the number of allocated PRBs is less than or equal to 4 ($N_{PRB} \leq 4$) in a PDCCH signal for UL grant, the UE analyzes the signaling as CQI only PUSCH allocation.

As described above, in the existing 3GPP Rel-8/9, simultaneous transmission of the PUCCH and PUSCH is inhibited for UL transmission having a low peak-to-average power ratio (PAPR) property. However, in the 3GPP Rel-10, a simultaneous PUCCH-and-PUSCH transmission mode may be configured through RRC signaling. That is, the UE may transmit a UCI (e.g., HARQ-ACK and/or SR) through the PUCCH and transmit only a CSI (e.g., CQI) or data (e.g., UL-SCH transport block) through the PUSCH on the same subframe.

According to the conventional power control method of the PUCCH format 3 described with reference to Equation 17, if control information is transmitted on an SR subframe through a PUCCH format 3, the control information always includes an SR bit (e.g., 1 bit) and an added SR bit is used to increase transmit power of the PUCCH ($n_{SR}=1$). In the conventional power control method, it is also assumed that simultaneous transmission of the PUCCH and PUSCH is not configured. That is, only the PUCCH or PUSCH may be transmitted on one subframe, and control information which is scheduled to be transmitted through the PUCCH is transmitted through the PUSCH if the PUCCH and the PUSCH should be transmitted on the same subframe. Accordingly, transmission of the PUCCH on the SR subframe indicates that UL-SCH resources/UL-SCH transport blocks for the SR subframe are not present. In this case, the SR bit added to the control information may be always used to carry valid information.

However, in consideration of configuring the UE with the simultaneous PUCCH-and-PUSCH transmission mode, it is necessary to more efficiently perform power control. For example, if it is assumed that the UE is configured in the simultaneous PUCCH-and-PUSCH transmission mode, a scenario in which the PUCCH format 3 signal and the PUSCH signal are simultaneously transmitted on the SR subframe is possible. In this case, the PUCCH format 3 signal may include an SR bit and the PUSCH signal may include a UL-SCH transport block. In addition, the PUSCH signal may include only a CSI. As described with reference to FIG. 30, if the UL-SCH resources/UL-SCH transport blocks are present for the SR subframe, the triggered SR is cancelled. That is, presence of the UL-SCH transport block in the PUSCH signal may indicate a negative SR. Accordingly, if the PUSCH signal includes the UL-SCH transport block, the SR bit included in the PUSCH format 3 signal carries redundant information. In this case, since the SR bit may have any value (don't care), the value of the SR bit may be regarded as invalid information. That is, if the UL-SCH transport block is present for the SR subframe, the SR bit included in the PUCCH format 3 signal corresponds to a dummy bit without information. Accordingly, if the case where the dummy bit is included in the PUCCH format 3 signal and the case where the dummy bit is not included in the PUCCH format 3 signal are equally treated during PUCCH power control, power efficiency may be decreased.

Hereinafter, the method for efficiently performing PUCCH power control in consideration of the simultaneous PUCCH-and-PUSCH transmission mode will be described. The following description will focus upon the method of correcting $h(\cdot)$ according to the UL signal transmission scenario of Equation 17.

If the simultaneous transmission of the PUCCH and PUSCH is configured, the UL transmission scenario is as follows:

(1) If the PUCCH format 3 signal for HARQ-ACK and the PUSCH signal are simultaneously transmitted on a non-SR subframe, the PUSCH signal may include data (e.g., UL-SCH transport block) or only a CSI.

(2) If the PUCCH format 3 signal for HARQ-ACK and the PUSCH signal are simultaneously transmitted on the SR subframe, the PUSCH signal may include data (e.g., UL-SCH transport block) or only a CSI.

In case of (1), the SR bit is not included in the control information for the PUCCH format 3. Accordingly, $h(\cdot)$ for power control of the PUCCH may be determined by using the following equation.

$$h(\cdot) = \frac{n_{HARQ} + n_{SR} - 1}{2} = \frac{n_{HARQ} + 0 - 1}{2} \qquad \text{Equation 18}$$

In case of (2), the following case will be considered in consideration of the SR.

i) The HARQ-ACK and SR may be transmitted through the PUCCH format 3 and only the CSI may be transmitted through the PUSCH. In this case, since the SR bit is a valid value indicating actual SR information, it is possible to perform power control of the PUCCH in consideration of the SR bit. In this case, h(•) for power control of the PUCCH may be determined by using the following equation.

$$h(\cdot) = \frac{n_{HARQ} + n_{SR} - 1}{2} = \frac{n_{HARQ} + 1 - 1}{2} \quad \text{Equation 19}$$

ii) The HARQ-ACK and SR may be transmitted through the PUCCH format 3 and the UL-SCH transport block (e.g., BSR or data) may be transmitted through the PUSCH. In this example, the SR bit may be used to indicate actual SR information, regardless of whether the UL-SCH transport block is transmitted on the SR subframe. In this example, if the UL-SCH transport block is transmitted on the SR subframe, the SR bit indicates a value (e.g., 0) always indicating a negative SR. Accordingly, if the UL-SCH transport block is present on the SR subframe, the SR bit in the PUCCH signal may be used to check error of the control information transmitted through the PUCCH. Since the SR bit carries valid information, h(•) for power control of the PUCCH may be determined by using the following equation.

$$h(\cdot) = \frac{n_{HARQ} + n_{SR} - 1}{2} = \frac{n_{HARQ} + 1 - 1}{2} \quad \text{Equation 20}$$

iii) The HARQ-ACK and SR may be transmitted through the PUCCH format 3 and the UL-SCH transport block (e.g., BSR or data) may be transmitted through the PUSCH. In this example, the SR bit may be treated as a dummy bit without information. That is, if the UL-SCH transport block is not present on the SR subframe, the SR bit included in the PUCCH indicates an actual SR bit (that is, actual SR information or valid bit). In this case, the MAC layer of the UE signals SR indication information to the PHY layer and the PHY layer sets the value of the SR bit according to the SR indication information. The case where the UL-SCH transport block is not present on the SR subframe also includes the case where the CSI only PUSCH is transmitted on the SR subframe (that is, an aperiodic CSI without a UL-SCH transport block). In contrast, if the UL-SCH transport block is present on the SR subframe, the SR bit included in the PUCCH signal indicates a dummy bit (that is, dummy information or invalid bit). In this case, the MAC layer may not signal the SR indication information to the PHY layer. Instead, the PHY layer may set the SR bit to a dummy value, depending on whether or not a condition is satisfied. The dummy bit may have a predetermined value. For example, the dummy bit may be set to a predetermined value of 0 or 1 and may be preferably set to 0.

More specifically, control information generated by multiplexing a HARQ-ACK bit stream [$b_0 \, b_1 \ldots b_{m-1}$] and an SR bit $s_0$ may be transmitted through the PUCCH format 3 and a UL-SCH transport block (e.g., BSR or data) may be transmitted through the PUSCH. Multiplexing of the HARQ-ACK bit stream and the SR bit includes attaching the SR bit $s_0$ to the end (or the front) of the HARQ-ACK bit stream [$b_0 \, b_1 \ldots b_{m-1}$] so as to generate [$b_0 \, b_1 \ldots b_{m-1} \, s_0$] and performing coding (that is, joint coding). In this example, the SR bit functions as a bit fixedly inserted for avoiding ambiguity of the control information size. The SR bit is set to a predetermined value (e.g., 0 or 1 and preferably 0) and the eNB may ignore the SR bit when decoding the control information. Instead, the eNB may determine whether or not the SR of the UE is triggered according to presence/absence of the UL-SCH transport block (e.g., BSR or data) of the PUSCH signal.

As described above, in this example, since the SR bit does not indicate actual SR information, the SR bit may not be considered during power control. In other words, if the PUCCH and the PUSCH are simultaneously transmitted on the SR subframe, the HARQ-ACK and the dummy SR may be transmitted through the PUCCH format 3 and the UL-SCH transport block (e.g., BSR or data) may be transmitted through the PUSCH. h(•) for power control of the PUCCH may be determined by the following equation.

$$h(\cdot) = \frac{n_{HARQ} + n_{SR} - 1}{2} = \frac{n_{HARQ} + 0 - 1}{2} \quad \text{Equation 21}$$

In this example, unlike Equation 17, since power control of the PUCCH is performed by $n_{SR}=0$, not by $n_{SR}=1$, even in the SR subframe, power efficiency for UL transmission can be increased. In this example, $n_{SR}$ may indicate the number of valid SR bits (SR bits having actual information). In addition, if the HARQ-ACK is transmitted on the SR subframe through the PUCCH format 3, the decoding efficiency of the eNB may be increased by always equally maintaining the payload size of the control information using the dummy SR bit.

iv) The HARQ-ACK may be transmitted through the PUCCH format 3 and the UL-SCH transport block (e.g., BSR or data) may be transmitted through the PUSCH. In this example, the SR bit is dropped. That is, if the payload size of the control information included in the PUCCH signal is N when the UL-SCH transport block is not present on the SR subframe, the payload size of the control information included in the PUCCH signal becomes N−1 when the UL-SCH transport block is present on the SR subframe.

Since the SR bit is not transmitted, although the PUCCH is transmitted on the SR subframe, unlike Equation 17, power control of the PUCCH is performed by $n_{SR}=0$, not by $n_{SR}=1$. Accordingly, h(•) for power control of the PUCCH may be determined by the following equation.

$$h(\cdot) = \frac{n_{HARQ} + n_{SR} - 1}{2} = \frac{n_{HARQ} + 0 - 1}{2} \quad \text{Equation 22}$$

The above-described method may be generalized as follows regardless of the configuration of the simultaneous PUCCH-and-PUSCH transmission mode.

$$h(\cdot) = \frac{n_{HARQ} + n_{SR} - 1}{2} \quad \text{Equation 23}$$

If the PUCCH format 3 signal is transmitted on a non-SR subframe, $n_{SR}=0$.

If the PUCCH format 3 signal is transmitted on an SR subframe,
if the UL-SCH transport block is not present, $n_{SR}=1$, and
if the UL-SCH transport block is present, $n_{SR}=1$ (Equation 20) and $n_{SR}=0$ (Equations 21 to 22).

Figure 31:
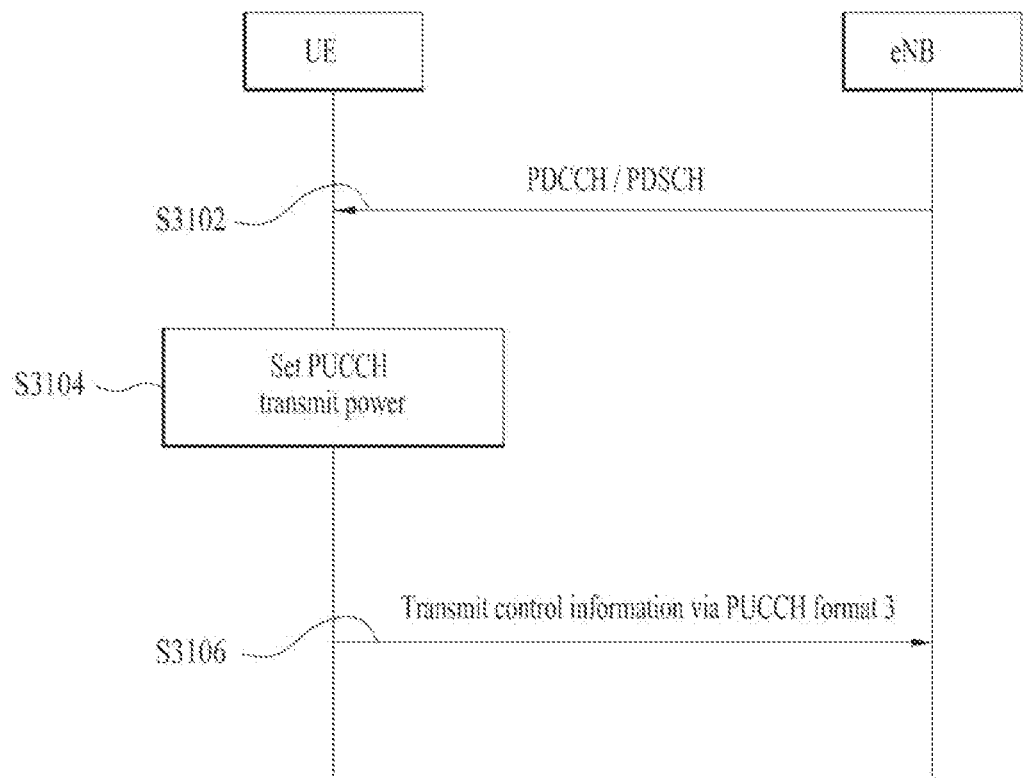
FIG. 31 is a diagram showing a process of transmitting control information through a PUCCH according to an embodiment of the present invention.

FIG. 31 shows a process of transmitting control information via a PUCCH according to an embodiment of the present invention.

Referring to FIG. 31, an eNB transmits a PDCCH and a PDSCH corresponding thereto to a UE (S3102). At least one of the PDCCH and the PDSCH may be received on one SCell.

Thereafter, the UE generates control information for transmission through the PUCCH format 3. The control information includes HARQ-ACK information for the PDSCH. If the HARQ-ACK is transmitted on the SR subframe, the control information further includes an SR bit. The SR bit is attached to the end (or the front) of the HARQ-ACK bit stream and the SR bit and the HARQ-ACK bit stream are joint-coded. The PUCCH format 3 signal is generated from the control information through the process shown in FIG. 29. The UE sets PUCCH transmit power for PUCCH transmission (S3104) and transmits the PUCCH format 3 signal to the eNB through a power control process, etc. (S3106).

In this example, if the PUCCH format 3 signal is transmitted on the SR subframe, transmit power for PUCCH transmission is set in consideration of whether or not the UL-SCH transport block associated with the SR subframe is present. For example, the transmit power setting method of Equation 17 is used and h(•) may be replaced with Equation 23 in consideration of whether or not the UL-SCH transport block associated with the SR subframe is present. The SR subframe indicates the subframe configured for SR transmission. The SR subframe is configured by a higher layer (e.g., RRC) and may be specified by a period/offset.

Figure 32:
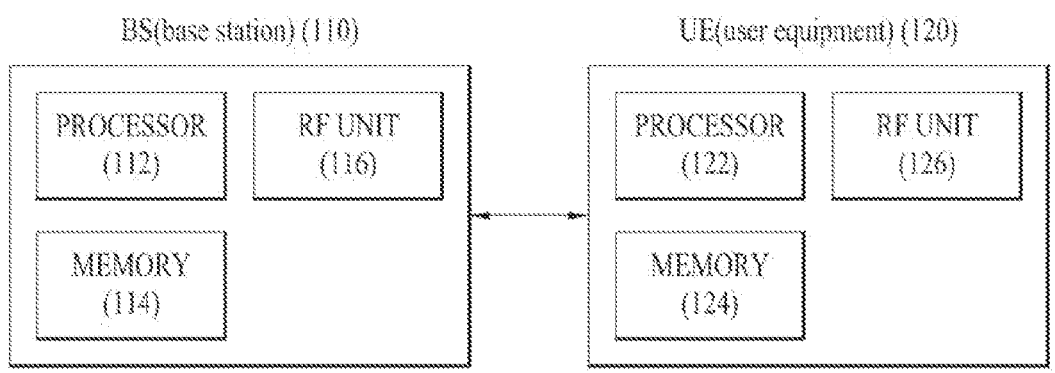
FIG. 32 is a diagram showing a BS and a UE applicable to the present invention.

FIG. 32 is a diagram showing a BS and a UE applicable to the present invention.

Referring to FIG. 32, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with the operation of the processor 112. The RF unit 116 is connected to the processor 112 so as to transmit and/or receive a RF signal. The UE 120 includes a processor 122, a memory 124 and a RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive a RF signal. The BS 110 and/or the UE 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

[Industrial Applicability]

The present invention is applicable to a terminal, a BS or another device of a wireless mobile communication system. More specifically, the present invention is applicable to a method and apparatus for transmitting uplink control information.

What is claimed is:

1. A method for transmitting a physical uplink control channel (PUCCH) signal by a communication apparatus in a wireless communication system, the method comprising:
   when a hybrid automatic repeat request acknowledgement (HARQ-ACK) transmission coincides with a subframe configured for a scheduling request (SR) transmission, generating the PUCCH signal including two or more HARQ-ACK bits and a SR bit for scheduling a SR; and
   setting a transmit power for the PUCCH signal by using a value $n_{SR}$; and
   transmitting the PUCCH signal using the transmit power,
   wherein $n_{SR}$ is 1 when the SR does not have any associated transport block for an uplink shared channel (UL-SCH) at the subframe, and $n_{SR}$ is 0 when the SR has an associated transport block for the UL-SCH at the subframe.

2. The method according to claim 1, wherein the transmit power for the PUCCH signal is set by using the following equation:

$$h(\cdot) = \frac{n_{HARQ} + n_{SR} - 1}{N}$$

where $n_{HARQ}$ includes a number of one or more transport blocks received over two or more configured cells.

3. The method according to claim 2, wherein $n_{HARQ}$ is a sum of the number of one or more transport blocks and a number, which is zero or greater, of semi-persistent scheduling (SPS) release physical downlink control channels (PDCCHs) received over the two or more configured cells.

4. The method according to claim 3, wherein the transmit power for the PUCCH signal at subframe i is determined by using the following equation:

$$P_{PUCCH}(i) = \min\begin{Bmatrix} P_{CMAX,c}(i), \\ P_{0\_PUCCH} + PL_c + h(\cdot) + \Delta_{F\_PUCCH}(F) + \Delta_{TxD}(F') + g(i) \end{Bmatrix}$$

where $P_{PUCCH}(i)$ denotes a transmit power for the PUCCH, $P_{CMAX,c}(i)$ denotes a maximum transmit power configured for a serving cell c, $P_{0\_PUCCH}$ denotes a parameter configured by a higher layer, $PL_c$ denotes a downlink path loss estimation value of the serving cell c, $\Delta_{F\_PUCCH}(F)$ denotes a value corresponding to a PUCCH format, $\Delta_{TxD}(F')$ denotes a value configured by the higher layer or 0, and g(i) denotes a current PUCCH power control adjustment state.

5. The method according to claim 1, wherein the SR bit is attached to an end of one or more of the HARQ-ACK bits.

6. The method according to claim 1, wherein the SR bit is set to 1 in case of a positive SR, and the SR bit is set to 0 in case of a negative SR.

7. The method according to claim 1, wherein the communication apparatus is configured with a simultaneous PUCCH-and-physical uplink shared channel (PUSCH) transmission mode.

8. The method according to claim 1, wherein one or more of the HARQ-ACK bits and the SR bit are joint-coded.

9. A communication apparatus configured to transmit a physical uplink control channel (PUCCH) signal in a wireless communication system, the communication apparatus comprising:
a radio frequency (RF) unit; and
a processor configured to
generate, when a hybrid automatic repeat request acknowledgement (HARQ-ACK) transmission coincides with a subframe configured for a scheduling request (SR) transmission, the PUCCH signal including two or more HARQ-ACK bits and a SR bit for scheduling a SR,
set a transmit power for the PUCCH signal by using a value $n_{SR}$, and
transmit the PUCCH signal using the transmit power,
wherein $n_{SR}$ is 1 when the SR does not have any associated transport block for an uplink shared channel (UL-SCH) at the subframe, and $n_{SR}$ is 0 when the SR has an associated transport block for the UL-SCH at the subframe.

10. The communication apparatus according to claim 9, wherein the transmit power for the PUCCH signal is set by using the following equation:

$$h(\cdot) = \frac{n_{HARQ} + n_{SR} - 1}{N}$$

where $n_{HARQ}$ includes a number of one or more transport blocks received over two or more configured cells.

11. The communication apparatus according to claim 10, wherein $n_{HARQ}$ is a sum of the number of one or more transport blocks and a number, which is zero or greater, of semi-persistent scheduling (SPS) release physical downlink control channels (PDCCHs) received over the two or more configured cells.

12. The communication apparatus according to claim 11, wherein the transmit power for the PUCCH signal at subframe i is determined by using the following equation:

$$P_{PUCCH}(i) = \min\begin{Bmatrix} P_{CMAX,c}(i), \\ P_{0\_PUCCH} + PL_c + h(\cdot) + \Delta_{F\_PUCCH}(F) + \Delta_{TxD}(F') + g(i) \end{Bmatrix}$$

where, $P_{PUCCH}(i)$ denotes a transmit power for the PUCCH, $P_{CMAX,c}(i)$ denotes a maximum transmit power configured for a serving cell c, $P_{0\_PUCCH}$ denotes a parameter configured by a higher layer, $PL_c$ denotes a downlink path loss estimation value of the serving cell c, $\Delta_{F\_PUCCH}(F)$ denotes a value corresponding to a PUCCH format, $\Delta_{TxD}(F')$ denotes a value configured by the higher layer or 0, and g(i) denotes a current PUCCH power control adjustment state.

13. The communication apparatus according to claim 9, wherein the SR bit is attached to an end of one or more of the HARQ-ACK bits.

14. The communication apparatus according to claim 9, wherein the SR bit is set to 1 in case of a positive SR, and the SR bit is set to 0 in case of a negative SR.

15. The communication apparatus according to claim 9, wherein the communication apparatus is configured with a simultaneous PUCCH-and-physical uplink shared channel (PUSCH) transmission mode.

16. The communication apparatus according to claim 9, wherein one or more of the HARQ-ACK bits and the SR bit are joint-coded.

17. The method according to claim 1, wherein the transport block for an uplink shared channel (UL-SCH) includes a buffer status report (BSR).

18. The communication apparatus according to claim 9, wherein the transport block for an uplink shared channel (UL-SCH) includes a buffer status report (BSR).

* * * * *